Aug. 30, 1966  SHUJI UMANO  3,269,136
APPARATUS FOR SEPARATION OF SOLVENT FROM SOLUTE BY FREEZING
Original Filed April 29, 1960  4 Sheets-Sheet 1
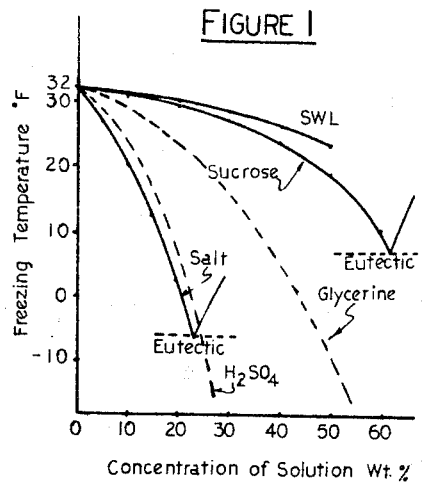
FIGURE 1
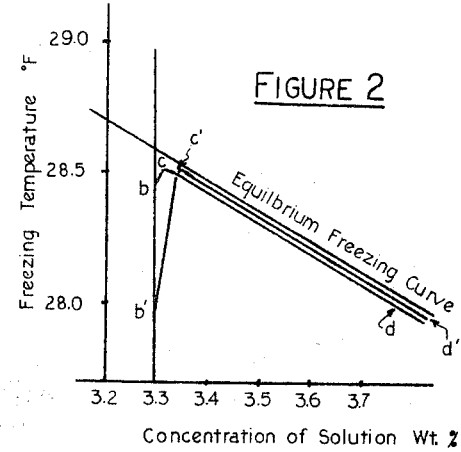
FIGURE 2
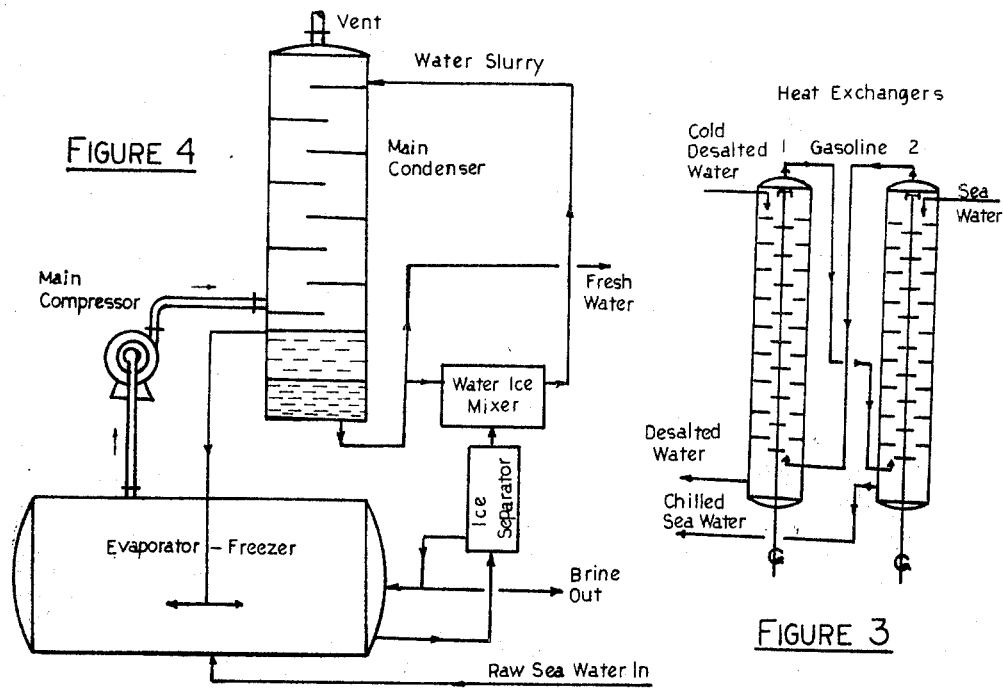
FIGURE 4
FIGURE 3
INVENTOR.
Shuji Umano Aug. 30, 1966  SHUJI UMANO  3,269,136
APPARATUS FOR SEPARATION OF SOLVENT FROM SOLUTE BY FREEZING
Original Filed April 29, 1960  4 Sheets-Sheet 2

INVENTOR.
Shuji Umano

Aug. 30, 1966      SHUJI UMANO      3,269,136
APPARATUS FOR SEPARATION OF SOLVENT FROM SOLUTE BY FREEZING
Original Filed April 29, 1960      4 Sheets-Sheet 4
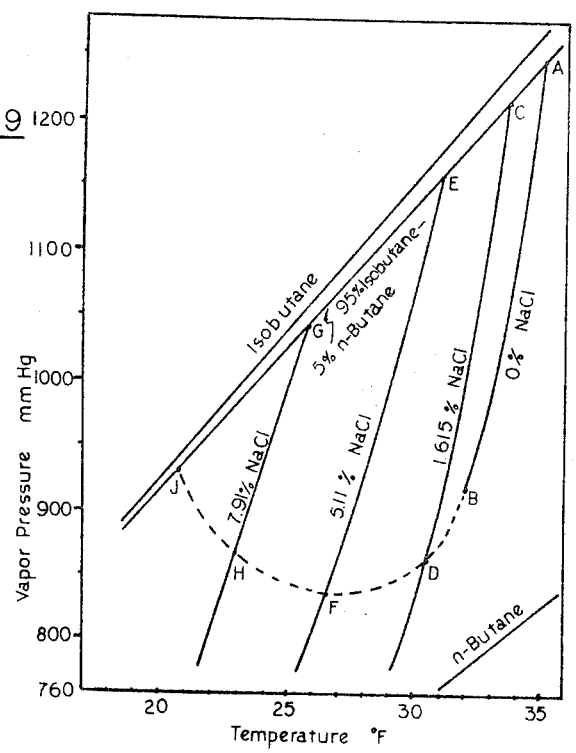
FIGURE 9
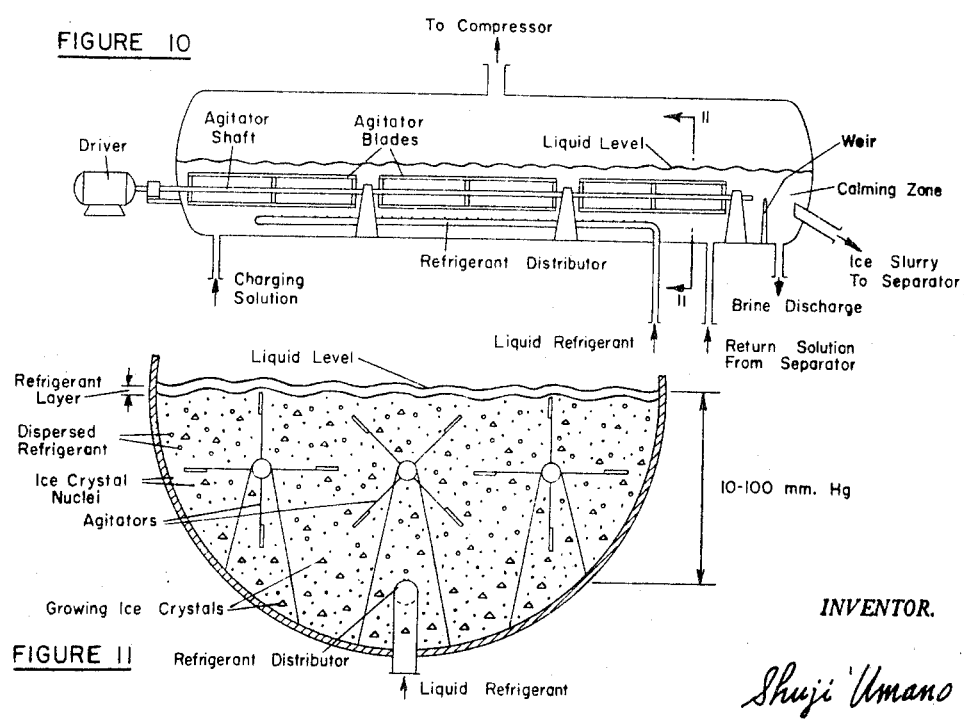
FIGURE 10
FIGURE 11
*INVENTOR.*
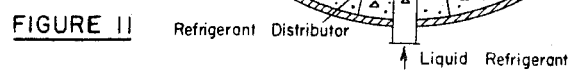

3,269,136
APPARATUS FOR SEPARATION OF SOLVENT
FROM SOLUTE BY FREEZING
Shuji Umano, 791 Nishikoiso, Aiso, Kanagawa, Japan
Continuation of application Ser. No. 25,618, Apr. 29, 1960. This application Dec. 15, 1964, Ser. No. 418,469
9 Claims. (Cl. 62—123)

This invention relates to apparatus for the removal of solvent, often but not necessarily water, from a solution in a practically pure form by freezing and the instant application is a continuation of my prior application Ser. No. 25,618 filed April 29, 1960, and entitled, Process for Separation of Solvent From Solute by Freezing of Solvent. The freezing is accomplished by a refrigeration process in which solution directly contacts the refrigerant fluid which is immiscible with the solvent. The nearly pure crystals which are formed are then separated and melted. The solvent is obtained nearly pure; and the solution simultaneously becomes more concentrated. There is only a relatively low requirement of energy because the heat which is given up in vaporizing the refrigerant fluid to freeze the crystals in the evaporator side of the refrigeration cycle is then discharged from the vapors in melting the crystals on the condenser side of the refrigeration cycle.

This apparatus may be used for the separation of water from naturally occurring aqueous solutions such as sea water, brackish water, etc., having too high a concentration of salts and other impurities for potable, irrigation, industrial, and other uses. It may also be used economically for the separation of water from industrially occurring solutions coming in the processing of many salts, bases, acids, sugars, glue, the pulping of wood, the preparation of concentrated fruit juices, coffee extracts, etc., normally concentrated by distillation or evaporation, or other well understood processes.

The problem of producing potable water which may hereinafter be called "fresh water" by the desalination of sea water or brackish water is of increasing importance in numerous municipal, agricultural, and industrial programs. While ample fresh water has always been important, the large increase of concentration of population and industry accentuate this problem in numerous places in the world. In many cases the expansion of communities, industry, or agriculture is entirely limited by the supplies of fresh water, which are presently completely utilized; and further expansion depends almost entirely on the ability to separate fresh water from sea water or brackish water—at moderate costs.

DEWATERING SOLUTIONS—FREEZING VERSUS EVAPORATION

Concentrating processes and apparatus have usually depended upon the evaporation of water from solutions and the condensation of the vapors formed to become fresh water. The water has passed from the liquid phase to the vapor phase, which is separated, and then back to the liquid phase, by condensation. The apparatus of the present invention depends upon freezing of the water from the solution, wherein the water passes to a solid phase which is separated, and then back to the liquid phase, by melting.

Up to a relatively high concentration of solution, such crystals of ice formed, like the vapors boiled off a solution, may be substantially pure water. Vapors from an evaporation process may carry droplets of mother liquid; and crystals of ice separated from a freezing process may also have on their surface small amounts of the mother liquid. Therefore, in both cases the water may be slightly impure. The freezing process is analogous to the evaporation process in other ways, some of which will be noted hereinafter in explaining the present process.

In evaporation of water about 970 B.t.u.'s of latent heat of evaporation must be supplied per pound leaving the liquid phase, while only about 144 B.t.u.'s of latent heat of fusion must be removed for each pound of water frozen. Thus, about 6.7 times as much heat must be supplied in evaporation as must be removed in freezing. Furthermore, if a usual temperature of about 62° F. is taken as the temperature of the entering sea water or other water, this is 30° above the freezing point (32° F.) representing about 30 B.t.u.'s of *specific* heat per pound, while there would be about 150° F. or 150 B.t.u.'s of sensible heat per pound in heating to the boiling point. Hence, the change in sensible heat would be about five times as much in heating to the boiling point as in cooling to the freezing point, both at atmospheric pressure.

Both the latent heats of transforming from the liquid phase and also the sensible heat which is required to raise or lower the temperature may be changed quite considerably from these gross amounts by heat exchangers, multiple effect evaporation, etc. However, these figures indicate roughly that there may be considerably lower requirements of heat or other form of energy in a process which separates water as ice as compared to a process which separates water as vapor.

Strictly speaking in either case, the only heat input or output required thermodynamically in concentrating a solution is the heat of solution of the solute in the solvent. The sensible heats and latent heats may conceivably be recovered in various thermodynamic processes, and the net change is the heat of dissolving the solute in the solvent. Practically, all such processes are attempts to recover more or less of the latent heats of freezing or boiling—or both—by one means or another; and the present one requires a low expenditure of heat (or other form of energy) and allows a substantial re-use of it. Thus the final energy cost is very low.

Since the temperature of the freezing process is usually much closer to the normal ambient temperature than is the temperature of the boiling process, in a freezing process the amount of heat passing through a given amount of insulation applied to operating equipment will usually be much less and energy losses by such transfer of heat will be less important.

Furthermore, since the actual temperature is so much lower, the corrosion of metals of construction will be very much less; e.g., usual carbon steel, which cannot be used satisfactorily because of corrosion by sea water at the high temperatures of most evaporation processes may be used with relatively very little corrosion at the temperature of freezing of ice from sea water.

Similarly, at the temperatures of most evaporation processes, dissolved solids in sea water show a bad tendency to scale and thus foul heat transfer surfaces— with all of the attendant disadvantages. Such scaling is non-existent in a well operated freezing process.

Furthermore, in an evaporation process all of the air or other gas dissolved in the solution is released to cause very substantial loss in the heat transfer coefficients with accompanying substantial increases in the amount of surface required for heat transfer. Also, the dissolved oxygen increases the corrosive effect on most metals. Prior operations to remove, more or less completely, the air must be utilized. In a well designed freezing process, it has been found possible to give practically no consideration to this solubility of air in the sea water or other solution to be converted.

Still another advantage of the freezing process is the elimination of all the disadvantages of the major problems of frothing and foaming which occur in evaporation processes—not so much in sea water conversion, but in conversion of alkaline brackish waters, and especially in dewatering of many aqueous industrial solutions.

THE VAPORIZATION-COMPRESSION-CONDENSATION REFRIGERATION CYCLE

This form of mechanical refrigeration is the one most commonly used. In the present invention, a refrigerant fluid is used which, by vaporization, cools and freezes the water or other solvent of the solution. The refrigerant liquid is one chosen as insoluble in the solution; and it may thus be used in direct contact therewith. It removes heat in its vaporization, to cause the necessary refrigerating effect and the freezing of the ice into a solid phase of substantially pure water. The second step in the refrigeration cycle is the compression of the vapors formed; and this is done, as usual, by a mechanical compression to give a higher pressure and hence temperature of the vapors.

Similarly the usual third step of condensation of the refrigerant vapors may be done by direct contact freezing on the surfaces of the crystalline ice itself, which has meanwhile been removed completely from the solution to a suitable container, so that the fresh water formed by melting may be kept entirely separate. The liquid refrigerant then goes back to the vaporization step for recycle.

The purpose of a refrigeration system is the elevation of the temperature level of heat removed (in this case, in freezing ice) up to the higher temperature of the heat discharge (in this case, in melting ice). Thus, a simple cycle of direct contact heat transfer is achieved in both the evaporator and in the condenser of the refrigerant cycle. As always used in thermodynamic cycles, heat exchangers are provided for recovering and reusing the sensible heat of the materials between the lower and upper temperatures. In the present invention, it has been found that direct contact between a refrigerant fluid, insoluble both in the solution and in the pure solvent produced may achieve the heat transfer relations without the interposition of the usual metallic heat transfer surfaces between the fluid phases involved in the process.

OBJECTS OF THE INVENTION

One object of this invention is to separate a solvent from its solution at a temperature not greatly different than the ambient temperature so that energy losses by heat transfer to the surroundings will be minimized.

Another object is to operate the apparatus at a temperature lower than the ambient temperature so as to minimize the effects of scale formation, and of corrosion of metallic equipment.

Another object is to operate a dewatering apparatus without substantial vaporization of the solvent so that little air or other gas is dissolved in the solution so that there is little or no foaming or frothing accompanying vapor release from the solution.

Another object of the invention is to utilize freezing process for separation of solvent from solution, e.g. water from sea water or other naturally occurring saline or brackish water, or from solutions occurring in industry.

Another object is to freeze ice from an aqueous solution by the evaporation of an insoluble thermodynamic refrigerating agent in immediate contact with the aqueous solutions.

Another object is to separate ice crystals formed by freezing as completely as possible from the mother liquor in a centrifugal separator and then to pass them to a condenser suitable for contacting ice with vapors.

Another object is to compress the vapors of the refrigerant to a higher temperature and pressure so they may condense on direct contact with the self-same ice crystals previously formed and substantially separated from the brine in order to melt them to produce a nearly pure water.

Another object is to use heat exchangers for transferring the sensible heat involved in the fluid streams by direct contact of liquids substantially insoluble with each other.

Another object is to provide an apparatus for dewatering to produce substantially pure solvent, e.g. fresh water, at a reasonable or low cost compared to other similar processes.

Still another object is to provide equipment for accomplishing these several steps of freezing, substantial separation of ice out of contact with vapors, condensation of vapors on ice after separation and washing free of mother liquor, heat transfer by direct contact, etc., which equipment will be efficient and economic of construction and operation.

These and other objects will become more apparent from the following description and drawings.

OUTLINE OF PRESENT INVENTION

Fundamentally, the present invention in its simplest form requires the freezing of the solvent out of a solution, often but not necessarily an aqueous solution, in which case the solid phase formed is usually ice. Herein the solution may be called a "brine" although it may be a sugar solution, a sulfite waste liquor from pulping operations, sea water, etc. as well as a solution of caustic soda, citric acid, sodium chloride, ammonium chloride, calcium chloride, sodium nitrate, or other non-volatile salt, acid, base, or other solid. The solution, chilled to the freezing point of ice therefrom (a lower temperature than the usual freezing point of pure water) is further refrigerated, under conditions of considerable, but carefully controlled agitation, by vaporization of a thermo dynamic refrigerant, e.g. isobutane or butane, which boils or has a vapor pressure about equal to one atmosphere slightly below 32° F. This is only slightly below the normal freezing point of ice from the brine. Vapors coming off at about atmospheric pressure are compressed to a higher pressure, and hence temperature, and are fed to a direct contact condenser to condense upon ice therein.

Ice crystals are formed in the freezing of the brine by the evaporation of the refrigerant in direct contact with the brine. Preferably the brine is in the continuous phase, with the refrigerant fluid dispersed therein. The ice particles are removed in a slurry with some of the brine and are passed to a centrifugal separator. Here, the brine is removed and the ice crystals are separated as free as possible of liquid, and are out of contact with the refrigerant. The nearly dry crystals are first washed with dilute brine entering the system, and then with a small amount of fresh water. They are again almost dry and are then put in a slurry of fresh water at the freezing point of water, 32° F.

This slurry of ice crystals and water at 32° F. is almost completely free of refrigerant. It is then circulated to the direct contact condenser, wherein the ice crystals meeting the compressed refrigerant vapors are melted while the vapors are condensed. An amount of water is formed, equivalent to the ice, all of which is melted, plus the water added to make up the slurry. Part of this fresh water is used for reslurrying subsequently formed ice crystals, and part is drawn out as the product.

Similarly a part of the brine in the slurry of crystals coming to the ice separator, after removal of the crystals therefrom, is returned to the evaporator of the freezing process and the balance is discharged in a concentrated form.

Thermodynamically, the process is thus seen to be a simple refrigeration cycle wherein heat is removed from the surroundings (by freezing ice) in vaporizing the refrigerant, the vapors are compressed and liquified in giving up heat to the surroundings (by melting ice) and the liquid refrigerant is recycled back to the vaporization step.

Suitable heat exchangers are provided with direct contact between an insoluble liquid heat carrier on the one hand and the cold brine and the cold fresh water on the other.

The invention may be modified to accommodate the thermodynamic inefficiencies which are involved due to heat losses or gains by the system, to the heats of solution, etc., also to account for the sensible heats controlled by the necessary temperatures of approach or temperature difference as a driving force in the various heat transfer relations. These temperatures of approach are very small since no metallic heat transfer surfaces are used, with their accompanying stagnant films requiring comparatively large temperature drops.

Whereas isobutane and particularly normal butane (or simply butane) are preferred refrigerants, other liquids either pure or mixed may be used if they boil at about atomspheric pressure in this same general range of 20 to 45° F. and are substantially insoluble with the particular solvent being used. If this is water, liquids such as hydrocarbons or halogenated hydrocarbons are useful. The halogenated hydrocarbons may have more than one halogen, as for example the well known fluoro-chloro-hydrocarbons often used as refrigerants. Also, modifications of the process may be made to accommodate differences of the operation in working with different industrial solutions as compared to the sea water or brine, particularly described. Thus, in the concentration of sucrose solutions, the same sequence of steps gives pure water and concentrated sugar syrups of from 20 to 40 degrees Brix or even higher.

Another important use of the invention has been found in the removal of water from temperature sensitive solutions of an organic nature, wherein decomposition of the molecule exists, and otherwise the rather expensive lyophilization process of freeze-sublimation is required. The sequence of operation is substantially that described above to obtain a very concentrated solution from which most of the water has been removed; and this may then be lyophilized if absolute dryness is required. In this case, the concentrated solution is already at the freezing point of water or lower, and ready for the lyophilization step.

Still another use of the invention is in the separation of water from hydrated solutions wherein the normal boiling operation decomposes the inorganic molecule due to a hydration effect, e.g. in concentrating solutions of various of the metallic oxychlorides.

A modification of the process has been found useful when it is desired to separate out crystals as hydrates, which hydrated crystals are incapable of formation at the temperatures normally required in evaporation. While hydrates may sometimes be obtained by evaporation and then cooling, this is difficult in the case of some solutions due to unfavorable solubility relations. The preparation may be performed in the single operation of this invention, during which crystallization of the hydrate occurs to allow its removal after the first concentration of the solution is obtained to a point of hydrate crystallization.

However, in the operation of the present invention, the separation of the water as a solid phase precludes the simultaneous separation of crystals of the solute, either hydrated or otherwise as may often be obtained during dewatering by evaporation.

PHASE DIAGRAMS, FLOW DIAGRAMS, EQUIPMENT DIAGRAMS

The attached drawings illustrate diagrams showing the relation of ice phase and solutions and diagrammatic flow sheets of the inventive process and equipment which have been found to be most effective. The drawings of the figures are exemplary only and are not to be regarded as limitations on the modifications of either the processes or the equipment which may be used in this invention to secure the advantages thereof. For purposes of reference and emphasis, named parts are capitalized. Storage tanks for incoming, outgoing, and intermediate process streams of liquids are not shown. Pipe lines for liquid transfer are shown as single lines, vapor lines as double lines. Pipe lines are always fitted with all necessary valves for control of the operation although such valves are not shown in the diagrammatic figures. Particularly, pressure reducing or flash evaporation valves are necessary where butane liquid passes to a lower pressure; and vaporization may occur. Likewise lines simply for transfer of liquids do not always have shown the necessary pumps, syphons, etc. However, such tanks, pumps, and piping accessories would be self evident to anyone familiar with processing equipment such as used in this invention.

FIGURE 1 is a plot of the equilibrium freezing curves for aqueous solutions of ordinary salt, sucrose, and sulfite waste liquid (SWL), i.e. black liquor from the pulping of wood by the sufite process. The vertical axis indicates the freezing temperature in degrees Fahrenheit, while the horizontal axis indicates the weight percent concentration of solids in the solution. Aqueous sulfuric acid and glycerol solutions are shown by dotted lines.

FIGURE 2 is a plot on a larger scale of the freezing relations of water from salt solutions together with assumed diagrams of freezing curves under non-equilibrium conditions.

FIGURE 3 is a schematic view of a pair of direct contact heat exchangers which have been devised as part of this invention.

FIGURE 4 is a diagrammatic flow sheet of some of the essential features of the process of the invention, in which some of the parts desirable for plant operation are deleted for simplicity.

FIGURE 9 shows vapor pressures of butane and isobutane, also of 5% butane, 95% isobutane mixture and of ice hydrates, and salt solutions in contact therewith.

FIGURE 10 is a diagrammatic longitudinal view of an Evaporator-Freezer suitable for use in the practice of the invention.

FIGURE 11 is a diagrammatic transverse view thereof, on an enlarged scale, taken on line 11—11 of FIGURE 10, and also depicts, in an exaggerated manner, the contents obtaining within the vessel and the total hydrostatic head on the liquid refrigerant. A quantity of refrigerant exists as liquid.

EQUILIBRIUM FREEZING OF SOLVENT FROM SOLUTION (FIGURE 1)

Figure 5:
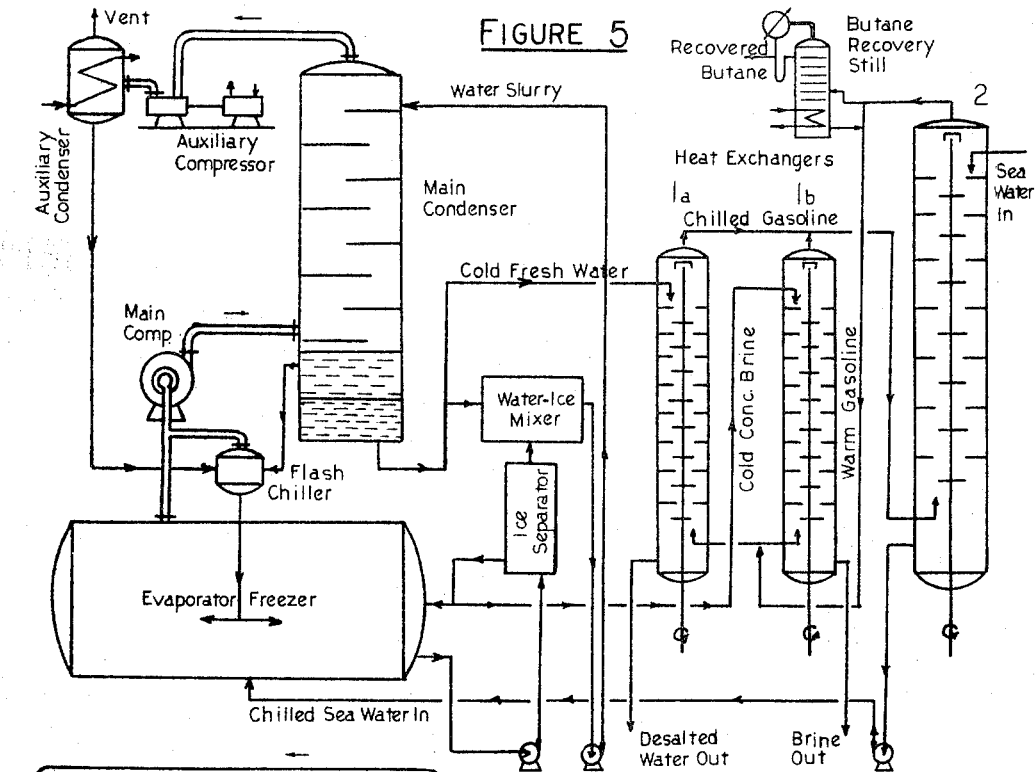
FIGURE 5 represents a combination of the simplified apparatus of FIGURE 4 with Heat Exchangers such as that of FIGURE 3 and other units to represent a typical flow sheet embodiment of the invention.

In a representation of the equilibrium between ice crystals and an aqueous solution, the temperature decreases with increasing concentration of the solution, or, as it is usually stated, the freezing point is lowered, or the depression of the freezing point is greater. This phenomenon may be considered for solutions of ordinary salt, sodium chloride. The physical properties are very slightly different for brines made from sea water, but the salt-water equilibria are simpler to present. Careful determinations show that there may be a fractional part of a degree difference in the freezing points of ice brines compared with sea water brines of the same total solids content, since sea water contains other salts in solution besides common salt, sodium chloride. At higher concentrations the difference may be more.

The relationship of this freezing of ice from salt solutions is shown by the lowest of the three curves of FIGURE 1, wherein is evident the much greater depression of freezing point in salt solutions of a given concentration of solids as compared to sucrose solutions, or to Sulfite Waste Liquor (SWL). The ionization, and particularly molecular weight of the solute are important in determining the shape of these curves. These curves represent the solid phase as pure water or ice, down to a temperature of the freezing point shown by the horizontal dotted lines for salt and sugar, which lines represent the eutectic compositions. In some other cases, a hydrate is formed as, for example, at concentrations above 23.3 weight percent salt in water, the eutectic point. Here there would be separated the hydrate of sodium chloride and water which, in this case, is the solid phase, a chemical combination of the water with the salt. In operation in such a concentration range higher than the eutectic, the process of this invention gives a hydrate rather than pure water. Such a hydrate could not be produced directly by the usual evaporation process.

The freezing of ice from sucrose and water solutions is shown by the middle curve of FIGURE 1. A eutectic or minimum freezing temperature is indicated at about 63% sucrose and about $+7°$ F., and this would thus be the highest strength of sucrose which could be made by this invention, before sugar appeared in the solids. Practically a concentration of not over 50% has been found to be a desirable maximum.

The equilibrium freezing point at which ice crystals form from the solution of various organic and inorganic materials in solution and suspension in Sulfite Waste Liquor from wood pulping processing is shown in the upper curve for which no eutectic point is shown. However, the solution becomes more and more viscous at the higher concentrations, to give a practical upper limit usually of a concentration of not over about 50% total solids.

In some cases where it is desired to separate principally the salts and other solids in solution in Sulfite Waste Liquor (or other black liquor from wood pulping) the separation of ice crystals simultaneously removes much of the ligneous organic solids to give a much concentrated and purified solution of the water solubles, principally the salts of the inorganic and organic acids.

In separation of ice crystals from these and other aqueous solutions, it is usually desirable not to concentrate the solutions to so high a solids concentration that the drainage of the viscous mother liquor from the crystals becomes difficult or a complete separation of the mother liquor from the ice crystals formed is impossible unless indeed, a cyclic process is involved where the solvent returns to an earlier process. It is also evident that the dewatering operation can be done from solutions of two or more solutes as long as no solute comes down into the solid phase. However, in some separations an object of a particular processing may be such a crystallization of the solute along with one of two or more solutes. Also with aqueous solutions of non-volatile liquids such as sulfuric acid and glycerol shown by the dotted lines of FIGURE 1, the separation of ice therefrom is exactly the same as from solutions of solids.

DYNAMIC FREEZING OF SOLVENT FROM SOLUTION
(FIGURE 2)

The above discussion refers to freezing with the crystals in equilibrium with the mother liquid after a very long time has been allowed for equilibrium to be reached; and usually the crystals have built up to a substantial size, and drainage of the concentrated solution of the mother liquor therefrom is easy.

However, in any commercially useful process, a maximum rate of freezing must be achieved to minimize the size of the required equipment, and to attain a reasonable production rate. Thus, the freezing must be made to proceed as fast as is possible, consistent with other factors. In previously operated freezing processes, there have been used heat transfer surfaces, usually in the form of metal tubes; and the ice accumulates on the chilled heat transfer surface and is scraped off, containing substantial amounts of mother liquor. This is a clumsy operation at best; and the present invention accomplishes the removal of heat to cause freezing without metallic heat transfer surface. Hence, the crystals form freely in the solution, chilled by direct contact with the evaporating refrigerant.

However, crystals which would be obtained by rapid chilling of the solution by very fast removal of heat therefrom are very small in usual processing; and it is necessary to obtain a relatively larger crystal. Too rapid a rate of crystallization involves the formation of many very small crystals rather than the growth of a fewer crystals into larger ones, since growth has a distinctly limited rate. Furthermore, the larger crystals formed may be drained readily and washed readily, substantially free of the mother liquid, while the small crystals formed by too rapid cooling are very difficult or impossible to separate from mother liquor without substantial amounts of brine thereon, which then appears in the final fresh water produced.

To understand the conditions of dynamic growth which control, reference may be made to FIGURE 2, a plot of Freezing Temperature in degrees Fahrenheit versus Concentration of Solution in Weight Percent Sodium Chloride.

A brine of a concentration about that of sea water is shown by the 3.3% ordinate. This is at a temperature above the freezing point, and if it is cooled very slowly, it might be expected that just at its intersection with the Equilibrium Freezing Curve a crystallization or incipient crystallization might be noted. However, crystallization is a time-consuming phenomena, to allow the solvent to build up upon any nuclei or seed crystals.

If there is now considered a rapid cooling or rapid descent along the ordinate of 3.3% concentration; the solution may be considerably super-cooled; and the temperature indicated by $b'$—or even lower—might be reached. At this point, crystallization starts; and because it is necessary for an equilibrium to be reached with regard to the thermal conditions, it is found that a rapid rise in temperature is obtained as a relatively large quantity of ice precipitates out in very fine crystals. Since the water which freezes into ice crystals gives off latent heat during freezing, this heat warms the solution; and the temperature may go up almost to the Equilibrium Freezing Curve. The point $c'$ will be at a higher concentration of solution than the original 3.3%, since some of the solvent has crystallized out to leave a more concentrated mother liquor.

Contrarywise, if there is a better stirring of the solution, as it is being cooled, and if there may be assumed to be some nuclei (either crystals already present, dust particles, etc.), the supercooling will not proceed to as low a temperature as before, for example only to the point $b$. In this case, the supercooling below the freezing temperature is much less marked; and the temperature rise to $c$ in coming to an equilibrium condition is also much less, also the change in concentration.

In any operation such as a continuous crystallizing process, heat must be removed from the crystal of ice to allow it to grow in size with additional freezing of water thereon. This means there is a temperature difference, driving the heat from the warmer ice to supply the latent heat of freezing necessary to freeze more water from the cooler brine. The vertical distance between the line cd and the Equilibrium Freezing Curve represents the difference in temperature required to accomplish the freezing at the rate encountered. In the case of the line c'd' there are very many small crystals and a very much greater surface area therefore in relation to the mass of ice which has been produced from the original solution. Hence, the line c'd' is very close to the equilibrium freezing curve; and there is a very low temperature difference.

On the other hand, for a relatively smaller surface area which is due to the larger crystals which are present at any given concentration of the remaining mother liquor, line bd is at a relatively greater distance from the equilibrium freezing curve; and there is a correspondingly greater temperature drop.

This point has been established quantitatively in experiments which have shown that the heat liberation rate in the crystal growth is proportional to the degree of supercooling. Thus, for any given change in concentration in a given time, there will be a given amount of water frozen; and if the area is greater for the large number of small crystals, it follows that the temperature difference must be less. Also, if the degree of circulation of brine over the crystal surface is increased, the rate will increase greatly, or the temperature difference will be less for a given rate. This effect has been found to be very important in the design and operation of the process and equipment of this invention. The laboratory determination and the quantitative indication has been made to give the optimum design, but these mathematical results will be presented elsewhere.

In general, a suitably agitated Evaporator-Freezer system had to be developed with the correct relation between the four phases, i.e. one solid, two liquid, one vaporous. Other controlling variables were concerned with the correct method, location and amounts of feeding of raw sea water and recycled liquid butane and concentrated brines for a unit of given size. Of great importance also was the design and control of the correct agitation technique for mixing the various phases.

The design, shape, and operating conditions of the Evaporator-Freezer thus determine the particle size of ice produced; and the operation has been found best with a size of ice particles in the range of 0.3 millimeter to 0.7 millimeter. This is at least 100 times the mass of crystals obtained in freezing processes of the prior art. Thus the drainage of the brine from the crystals produced according to this invention is relatively easy; and there is possible the production of fresh water, almost free of mother liquor, and hence nearly completely desalted. Also, these larger crystals are necessary in order to use any type of centrifugal separator.

HEAT TRANSFER FROM THE BRINE TO BUTANE LIQUID DROPLETS

The latent heat of freezing which is removed from the crystal, as it grows in the large mass of brine with a consequent removal of water, must be passed to the liquid solution or mother liquid and from there to a drop or other small mass of butane in suspension in the liquid. This drop of butane is in turn vaporizing due to the balancing of latent heat of fusion of the ice through the equal amount of sensible heat transferred through the mother liquid to the equal amount of latent heat of the vaporizing butane.

Here again the extensive studies made of this interesting phenomenon have shown the rate of heat transfer, and allowed the development of the most favorable conditions and the determination of the optimum design of the Evaporator-Freezer. Two general conclusions may be drawn from this work as criteria in specifying the operation and the equipment; one is that the butane should be the dispersed phase, and a second is that there should be a rather considerable, but carefully controlled, agitation.

One consideration in controlling the operation is that the butane, in evaporating from its liquid drop, gives a vapor which tends to rise more rapidly through the brine than does the butane liquid itself. At first, the drop of butane during its agitation is rising in the brine bulk phase because of its lower density; and as the butane evaporates, the vapor bubble usually entrained within the butane liquid drop causes both to rise more rapidly, to spin in the brine as a distorted vapor bubble inside the liquid drop of butane, and ultimately to come to a surface where the vapor disengages to pass off. The butane liquid of the disengaged droplets makes a layer of liquid butane and is again dispersed as droplets into the body of the solution.

The quantitative evaluation of this heat transfer phenomenon has been made; and it is most important in the design of the Evaporator-Freezer, but its physical and mathematical explanation will be given elsewhere. Suffice it is to say for an understanding of the invention that in ordinary agitation, at normal operation conditions, the total area of the interface of the liquid butane droplets with the brine will be in the order of several scores to several hundreds of square feet per cubic foot of volume of the liquid in the Evaporator-Freezer. If the difference between the average temperature of the butane drops and the average temperature of the brine would be as high as only 1° F., the production rate of ice per hour per cubic foot of the Evaporator-Freezer liquid volume has been found to be as much as from some hundreds of pounds to a ton per cubic foot, which is a resonable value for industrial equipment.

Thus, the transfer of heat in the Evaporator-Freezer from the ice to the brine, to the butane liquid, to the butane vapor, is accomplished during a simultaneous mass transfer of water from the brine to the solid ice particle, in crystallizing thereupon. The consideration of crystal sizes and shapes, and of the size of butane liquid drops and of the growth of butane vapor bubbles are all very important in evaluating the performance of the process and equipment of this invention. For example, it can be shown that the growth of the crystal must be in a much larger bulk of mother liquor than a drop dispersed in a butane phase, since the ice crystal formed under such a condition would be very small. Also, the chance for it to grow larger after the size of its growth from that limited amount of water would be very small, since it would be surrounded with the butane and would have little chance to become part of another brine system. Preferably the Evaporator-Freezer has a large horizontal cross section, a maximum of about 6 feet in total liquid depth, agitators designed to mix the butane liquid into the brine phase, and a calming section to allow withdrawal of a slurry of brine and ice without butane. A quantity of butane liquid always exists as dispersed droplets.

ENERGY CONDITIONS IN DIRECT CONTACT REFRIGERANT - EVAPORATION - FREEZING PROCESS

As has been shown, there must be a small temperature difference between the freezing ice and the vapors carrying this heat of fusion, now as latent heat of vaporization, to the condenser. Conversely there must be a small temperature drop in the condenser between these vapors and the ice crystals which are being melted there. This temperature drop in the Main Condenser has been found to be about the same as in the Evaporator-Freezer, and the experimental determination is also difficult.

In those processes using water itself as the refrigerant vapor, the temperature range to equal the total of these two temperature differences of a few degrees Fahrenheit represents a larger ratio between the vapor pressure of ice at the lower temperature of the freezing brine and the vapor pressure of ice at its melting point in the condenser.

Thus, the vapor pressure of ice at 23° F. is 3.013 mm. Hg while that of ice at 32° F. is 4.579 mm. Hg, a ratio of compression required if water vapor is the refrigerant of about 1.53. Actually, to melt the ice, at a satisfactory rate, a pressure of water vapor of about 6.318 mm. (34.5° F.) would be required, to give a compression ratio of over 2.0.

For isobutane at −3.2° C., or 27.5° F., the pressure is 1083 mm. while at 0° C. it is 1306 mm., a compression ratio of 1.21.

The relative volumes of the vapors to be handled, however, vary inversely in the ratio of these absolute pressures. Thus, the required size of the compressor would be in the hundreds of times as large when using water vapor compared to using butane vapor.

It also follows that with a higher capacity operation of the Evaporator-Freezer and hence of the Main Condenser, there will necessarily be greater driving forces to give the same capacity within the same unit. These greater driving forces of temperature necessary to transfer heat will represent a greater compression ratio across the Main Compressor. In operating with a sea brine concentration of about 5%, it has been found that in order to double the capacity in the same equipment the compression ratio may have to be increased from about 15 to 35%, while the vapor mass is about doubled. Usually, equipment design does not allow for operating over such a wide range of capacity; and, as is seen, not at an optimum efficiency.

In such an ideal situation, it is assumed that the amount of heat required to be removed from the freezing of the ice is equal to that which is taken up in the condenser by the ice in melting, and that this represents the theoretical minimum of energy requirements of the system. Actually there is considerable additional energy requirements due to losses in heating and cooling streams of liquids, also due to thermal leaks even though the equipment is insulated. Furthermore, there are thermodynamic inefficiencies or losses such as in the compression itself.

As only one example of the many aspects in the determination of the best conditions for the operation of this invention there may be considered the relation of the concentration of brine maintained in the Evaporator-Freezer by balancing the amount of brine discharged from the system against the amount of dilute solution fed thereto.

This ratio of feed to discharge determines the amount evaporated and especially the concentration of brine discharged, hence that of the brine in the Evaporator-Freezer. If the concentration there is higher, there will be a greater depression of freezing point, a lower pressure on the suction of the Main Compressor and a higher energy requirement on the driving motor. Also, there will be a greater trouble in separating the more concentrated brine from ice crystals to give the desired minimum salt content in the product fresh water. Thus, there will be a greater amount of fresh water wash required, with consequent increase of energy cost per unit of net production. On the other hand, there will be a lesser amount of fluid passing in the heat interchangers, smaller sizes of equipment, and less heat gains through insulation. Of more importance, there will be a lesser amount of sensible heat unavoidable supplied, due to inefficiency of the heat interchanging. These advantages and disadvantages have been balanced for various conditions to determine the optimum concentration in operation of this invention. For sea water conversion, this is usually from 6 to 7.5% total solids in the brine discharge, although concentrations as high as 15% have been reached.

DIRECT CONTACT LIQUID-LIQUID HEAT EXCHANGER SYSTEM (FIGURE 3)

In the present invention both fresh water and concentrated brine are to be discharged from the system, and the temperatures of these discharging streams are at about the freezing point of water, while sea water or other dilute solution at some higher ambient temperature must first be chilled. The chilling of the one stream by either or both of the other two would usually be done by the use of heat exchangers with metallic barriers, e.g. tubes, between the two different liquids. Because of the stagnant liquid conditions and film formation on each side of this metallic surface, this introduces a considerable temperature differential between the average temperature of one liquid at any on point as compared to the average temperature of the other liquid directly through the metal barrier. Elimination of as much as possible of this temperature differential is desirable because such temperature differential requires a greater pressure differential of the thermodynamic refrigerant, butane vapor, hence a greater compression ratio and hence a greater energy for the compression.

Alternately it is possible to transfer the heat from one fluid by direct contact with an additional fluid stream insoluble therein, and from this to the desired second stream by direct contact if the added liquid is also insoluble in the second process stream as well.

Such direct contact of the fluids undergoing heat interchange may be utilized to minimize the effect of the inefficiencies of metallic surfaces if the fluids are mutually insoluble.

The final fresh water from melting ice is at substantially the ice temperature; and its cooling effect should be utilized in prechilling raw sea water coming into the system. By passing the cold fresh water in direct counter current contact with a stream of gasoline, the gasoline is chilled. In a second unit, this gasoline may then be passed in direct counter current contact with the raw sea water to chill it; while the gasoline is warmed. The warmer gasoline is recycled to the first unit to warm the cold fresh water.

FIGURE 3 shows this heat interchanging operation being done in a series of two towers; the cold desalted water is passed to the top to the left tower; it is intimately mixed as it settles downwardly through the lighter gasoline to the bottom where it is discharged. Simultaneously it has been warmed by the gasoline as the gasoline is cooled. The chilled gasoline from the top of the Heat Exchanger 1 is then passed to bottom of Heat Exchanger 2 where it rises counter currently against and in direct contact with a stream of sea water coming into the system at the ambient temperature. The gasoline is in turn warmed, while the sea water is chilled before being discharged at the bottom of Heat Exchanger 2.

Various designs of direct liquid-liquid contactors have been used, such as ordinary so-called "open tube" contactors without any internal parts but with means of forming droplets at the inlet of each of the respective liquids countercurrently passing each other. Another type preferred in this invention as a liquid-liquid contactor is the well-known "disk and ring" device wherein a plurality of disks suitably spaced on a rotating vertical shaft disperse the rising gasoline and falling brine layers into an annular space broken up by baffles in the form of rings, to accomplish a decantation, resettling, recontacting, etc. throughout the length of the column. Two such units such as those in FIGURE 3 accomplish the operation. The speed of rotation, the size of the disks and rings, the relative dimensions for a given throughput are all amenable to design calculations depending upon the relative densities and amounts of the two liquid streams, the amount of heating or cooling to be done upon each, the volumes of through-put of each phase, etc. In FIGURE 3 the gasoline is merely a carrier of heat from the warmer sea water to the colder brine and cold desalted water. A relatively inxpensive unit of equipment is obtained with relatively low temperatures of approach. The valves, controls, pumps, syphon devices, etc. necessary to make this a working unit are not shown in this diagram.

In the freezing process, the subject of this invention, besides the cold desalted water, there is also a stream of the cold concentrated brine from which the chilling effect is also to be recovered. Two such pairs of direct contact heat interchangers may thus be used. Alternately, since the sea water fed is equal to the sum of the brine stream and of the fresh water stream, two of the left, direct contactor Number 1 Heat Exchangers may be used with a single Number 2 Heat Exchanger large enough to handle the combined streams of chilled gasoline to pass counter currently with the raw sea water stream.

In the present invention both gasoline and higher naphtha or other petroleum fractions have been used. Usually the higher the boiling range of the petroleum fraction, the greater the viscosity and hence power cost in the rotating direct contact heat exchange, and the less the mutual solubility with water. For producing potable water, a carefully refined fluid is desired, preferably acid and alkali washed or otherwise treated to minimize taste and smell.

Since both the chilled fresh water and the chilled brine streams are saturated with butane (a few hundredths of a percent) the gasoline or other hydrocarbon heat transfer agent in the heat exchanger wil extract this from the aqueous streams, simultaneously with the heat transfer operation. After a long time, it has been found worth while to take a small part of the recirculating stream of heat transfer fluid, and distill it through a short distilling column to remove the dissolved butane. This is condensed and returned to the system, and the hydrocarbon heat transfer fluid, stripped of butane, is also passed back for reuse. This is not shown in FIGURE 3.

EXAMPLE OF OPERATION OF FUNDAMENTAL PARTS OF PLANT FOR DEWATERING BY FREEZING (FIGURE 4)

The combination of the several fundamental and essential steps of the invention are indicated in the flow diagram of FIGURE 4. Here the Evaporator-Freezer has a continuous feed of sea water, with the freezing taking place due to the evaporation of butane and the consequent chilling and freezing of ice from the brine.

It has been found that the intimate mixture necessary for heat transfer between the ice crystals being formed and growing in the brine and the vaporizing liquid butane may best be accomplished with the brine as the continuous phase. Liquid butane is thus dispersed as droplets throughout the brine—rather than vice versa. With the brine as the dispersed droplets, there has been found to be a tendency to crystallize smaller, more porous, less readily drained crystals. Thus, there is always a large amount of the brine present; and an adequate agitation system is used to disperse the butane as droplets or other small masses.

The vapors from the boiling butane are withdrawn by a compressor at the saturation pressure of butane corresponding to a temperature slightly below that of the freezing temperature of the most concentrated brine. These vapors are compressed with a ratio between about 1.25 and 1.5 of the absolute pressure in the Evaporator-Freezer and are passed to the lower part of the vertical Main Condenser.

The ice crystals formed in the Evaporator-Freezer are withdrawn in a slurry with the concentrated brine from a low point where there is no butane. This brine-ice slurry is passed to a centrifugal Ice Separator wherein, by a rotating screening mechanism, the brine is passed through a conical or cylindrical rotating screen which discharges solids upwardly. The crystals are substantially separated from the brine, only about 2 to 4% adhering thereto. A very small amount of butane is dissolved in the brine forming the slurry and this is the only amount (either vapor or liquid) passed to the Ice Separator.

The Ice Separator has no butane vapors present as such therein, either at the pressure of those in the Evaporator-Freezer, or at any higher pressure. Removal of mother liquor, i.e. brine from the ice crystals may be done best, as has always been standard practice in crystallizing operations, by the careful washing with a small amount of a purer liquid than the mother liquor.

A stream of the raw sea water, which is of lower concentration of salt than the brine, is used as a first washing fluid of these nearly dried, and almost pure ice crystals. This single washing stream may often suffice, depending on the amount of impurities (as mother liquor) which may be allowed to adhere in giving a product fresh water of sufficiently low content of total solids. Additionally, a stream of a small amount of fresh water may be used as a second washing fluid. These wash streams are not shown in FIGURE 4. They are combined with the brine discharged from the Ice Separator, or preferably, they may go in a separate stream back to the Evaporator-Freezer.

The Ice Separator may also have incorporated as an integral part of it or as a separate unit, a Water-Ice Mixer wherein fresh water is used to form a slurry with the drained ice crystals, almost free of liquid. In the drawing, for simplicity of presentation, the Water-Ice Mixer is shown as a separated unit from the Ice-Separator.

The water-ice slurry from the Mixer passes to the top of the tower which forms the Main Condenser. This is constructed of plates inside acting very much as baffles for the slurry to flow—almost across the cross section drop to the next plate, etc. The Water-Ice slurry passes over the plates, and descends from plate to plate in direct contact with, but against the rising stream of, the vapors from the Main Compressor.

Packed towers, including those filled with Rashig rings and similar shapes, have been found undesirable for this service of the Main Condenser, due to the tendency of plugging in the spaces between the packings with the ice crystals and undue channeling therefore. The preferred form is therefore a tower with large vapor passages from bottom to top and many trays over which water-ice slurry flows. This unit has substantially no diminution of pressure throughout, hence the lowest possible temperature of approach.

Other possible variations in the condenser arrangement include an open tower with large, free spaces for flow of the slurry, always in contact with the vapors and with baffle plates extending more than half way across the cross-section. Another preferred form is a spray chamber using an open form of spray nozzle—particularly for large units; and yet another suitable device is a tower with sheets of the slurry falling from top to bottom.

The vapors from the Main Compressor by direct contact, condense, pass on their latent heat in melting the ice crystals, while the mixture of the two liquids, butane and fresh water at a temperature between 32° and 34° F., descends to and decants in the lower part of the Main Condenser tower. The over-flow of the decanting section is the liquid butane, which passes back to the Evaporator-Freezer in such a way as to give a maximum of distribution thereof to repeat the heat transfer relations of evaporation, compression, and condensation of the butane, acting as the refrigeration fluid.

A vaporization valve or similar device may be incorporated in the liquid line from the Main Condenser back to the Evaporator-Freezer to control the flow back and vaporization of the liquid butane. Alternately an inverted syphon trap and suitable height of liquid butane flowing back may act as an automatic compensation for the difference in pressure between the Main Condenser and the Evaporator-Freezer. If the top of this inverted syphon trap is placed high enough above the Evaporator- Freezer, this tray may automatically control the flow-back and vaporization of the liquid butane in passing to the lower pressure and temperature.

The fresh water discharged from the bottom of the decanting section of the Main Condenser contains less than 300 parts total solids and is potable. This water contains a very few hundredths of a percent of butane dissolved therein, but this is evaporated and lost readily by aeration or by standing in an open storage tank.

The refrigerating effect required in the Evaporator-Freezer is that for: (a) the freezing of the ice, (b) the pre-cooling of the raw sea water, (c) the cooling of the butane from the higher temperature of the condenser, (d) heat losses or heat gains in the system, and (e) the inefficiency of the compressor. The sole amount of heat removed in the condenser is the melting of the ice which is equal only to (a). Hence, there is an additional amount of heat which must be removed from the vapors of the butane, or a substantial amount of vapors which will not condense. This amount of vapors will pass the vent at the top of the condenser. A mechanism for their condensation is not shown in this picturization of the bare essentials of the process of the invention.

EXAMPLE OF NORMAL OPERATION OF PLANT FOR SEA WATER CONVERSION (FIGURE 5)

The flow sheet diagram, FIGURE 5, shows the general arrangement of the vessels, machinery, and piping required for a plant which has been used experimentally in making 6 to 8 tons per hour or 35,000 to 50,000 gallons per day of fresh water from sea water. FIGURE 5 is idealized slightly for simplicity and clarity of presentation from the actual operating plant. Some parts are delected which are essential but not necessary for explanation because of their more or less standard nature.

*Direct contact Heat Exchangers.*—The sea water enters the system at 59° F. in an amount of 13.5 tons per hour. It passes to a direct contact Heat Exchanger of the general type shown in FIGURE 3 and is chilled to about 38° F. by giving up a part of its sensible heat to heat to 50° F.—via a heat circulating fluid, gasoline—the separate liquids leaving the system which are concentrated brine and desalted product water. Two units, 1a and 1b, are used in parallel instead of the single unit 1 in FIGURE 3 for chilling the gasoline used as the heat carrying fluid. The leaving liquids, concentrated brine and desalted product water, severally are supplied to the units 1a and 1b to chill the gasoline circulated therethrough. The gasoline so chilled is then circulated through a single unit 2 to chill the inlet sea water. Approximately 6,350 gallons of gasoline are circulated per hour, approximately one-half going to 1a and one-half to 1b.

*Evaporator-Freezer.*—The chilled sea water at about 38° C. is passed into the Evaporator-Freezer. A typical construction of Evaporator-Freezer is illustrated in FIGURES 10 and 11 and is shown as comprising a horizontal cylindrical vessel, about 6½ feet in diameter by 26½ feet long, having a capacity of about 875 cubic feet. It is fitted with horizontally rotatable, wholly immersed, blade-type agitators suitably supported on spaced bearings, and a weir near one end or tail of the vessel to provide a calming zone or unagitated section in which brine-ice slurry settles free of liquid butane.

The refrigerant liquid, butane, recycling back from the Main Condenser, is introduced through a sparge pipe or distributor arranged below the agitators and is intimately mixed with the brine in this vessel by the agitators. The refrigerant, which constitutes at least 10 to 15% by volume of the total liquid in the Evaporator-Freezer, is boiled off at the rate of about 8 to 8.5 tons per hour since the temperature of the freezer is slightly above the boiling point of the butane at the pressure, approximately atmospheric, of the Evaporator-Freezer. (Because of the relatively low temperature difference between ice brine, butane liquid, and butane vapor, this is not considered here.) The freezing point of the resulting concentrated brine corresponds to that for about 6.2 to 6.8% total solids, or twice as concentrated as the 3.2% total solids present in the inlet sea water which is admitted into the head end of the vessel. In a continuous unit, it follows, that the concentration of the operating solution must be that of the discharge, i.e. the most concentrated. The latent heat of freezing of ice crystals out from the brine is given up in supplying the latent heat for boiling the butane; and this Freezer for ice crystals is also the Evaporator for butane in its refrigeration cycle. The ice crystals collect in the calming zone away from the agitation zone where there is no liquid butane and are removed near the bottom, shown at the tail end of the vessel, in a slurry of from 10% to 20% by weight ice in the brine, now concentrated from the sea water by this removing therefrom of liquid water as ice. Mother liquor separated from the ice crystals is shown as returned toward the Evaporator-Freezer, part to enter this vessel to maintain the desired solid-to-liquid ratio of the slurry removed and part to be discharged from the system. The butane vapors go to the Main Compressor through an outlet in the top of the vessel.

*Main Compressor.*—The vapors of butane, approximately 8 to 8.5 tons per hour, leave the Evaporator-Freezer and must be compressed to a higher pressure, as is usual in every refrigeration process. This higher pressure gives sufficient increase in the corresponding saturation temperature to allow adequate temperature drop to cause heat transfer and condensation, whereby the vapors give up their latent heat in melting the ice crystals. This increase in absolute pressure is only about 27% in this case. (In other embodiments of this invention, it may vary between about 10% and 150%.)

The Main Compressor thus is a standard, commercial turbo-compressor of capacity of 1,500 cubic feet per minute operating at a compression ratio of about 1.27, a moderate pressure ratio for this type of machine. (In practice this was found to vary between 1.2 and 1.3, although the installed turbo-compressor was designed for a ratio of 1.6.) Even a very large plant would use only a single, more or less standard compressor. For example, a plant for 10,000,000 gallons per day of fresh water would require only one compressor of 300,000 cubic feet per minute, a reasonable maximum commercial size for such a unit.

*Ice Separator.*—The slurry of ice crystals and brine and practically no butane liquid is drawn from a bottom point of the Freezer-Boiler out of the agitation effect, and fed into the Ice Separator, a specially designed continuous centrifuge with a vertical conical basket which separates the ice crystals. The operation of the Evaporator-Freezer gives relatively large crystals of 1 millimeter or larger average maximum dimension in contrast with other evaporation-freezing processes producing crystals only a few percent of this individual mass, which thus have a much greater surface area per unit mass. Ready separation and drainage of the mother liquor from the brine is thus accomplished with a relatively low centrifugal force in this machine having only about 50 times the force of gravity. There is no butane vapor present during the separation of ice. The small fraction of a percent of butane soluble in the brine is the only amount in contact with, in liquid phase, the Ice Crystals.

These crystals when washed only with a small amount of sea water, give, when melted, a desalted water containing 960 p.p.m. of total solids. By washing these in the Separator also with 3 to 5% of their weight of fresh water, the crystals on melting give water of less than 300 p.p.m. total solids. The sea water and desalted water used for washing must be maintained just at the freezing point to minimize melting of the crystals. (The piping connections to the Ice Separator for the small streams of wash liquids thereto are not shown. The discharge of these wash streams may go directly back to the Freezer-Evaporator.)

The washed ice crystals are discharged upwardly from the Ice Separator. They are reslurried in a stream of about 45 tons per hour of desalted water, just at the freezing point. In FIGURE 5, this device for forming a slurry of fresh water and ice crystals is indicated as a separate unit labelled Water-Ice Mixer. However, this device has been incorporated also as an integral part of the Ice Separator, which then discharges the fresh water-ice slurry directly to the Main Condenser.

*Main Condenser.*—The crystals in the slurry with the recycle stream of desalted water are passed to the Main Condenser, a tower with diameter of 40 inches and overall height of 36 feet. It contacts directly the compressed vapors of butane coming from the Main Compressor with the slurry of ice crystals in the recycle stream of fresh water. This Condenser, a vapor-liquid contactor, is constructed and performs somewhat as a very simple distilling tower with relatively simple plates extending nearly across the column cross section. These are alternately spaced baffles. The fresh water slurry of melting ice crystals passes across each one and drops to the one below. This gives a counter current relation to the rising and condensing vapors of butane, approximately 5.9 to 6.1 tons per hour of which condense. The combination of heat transfer—and changes of phases—gives desalted water and butane liquid at the bottom part of the Main Condenser, which part acts as a decanter. A preferred condenser will have no diminution of vapor pressure bottom to top; otherwise compression pressure rises. Wide vapor passages up the side of the unit with vapor flowing across the plates have ice crystals condensing from the water-ice slurry, thereon.

The liquid butane forms an upper layer (specific gravity about 0.6) which is withdrawn from the side near the bottom. The desalted water at a temperature of about 35° F. is discharged from the base; and a small amount is used in the Ice Separator to wash the crystals, but the connecting line for this minor flow is not shown. Another part of this fresh water is recycled to form a slurry with subsequent crystals to be washed and mechanically transferred to the Main Condenser. This recycle stream of about 45 tons per hour is constant and acts merely as a mechanism for carrying ice crystals through the Main Condenser from the Ice Separator. The balance of the desalted water discharges from the Main Condenser as the product of the system, about 7 tons per hour. It passes through the Heat Exchanger 1a to chill the entering sea water through or by chilling circulating gasoline.

As in the Evaporator-Freezer, the heat transfer in the Main Condenser requires a very low temperature drop, and the condensation takes place at about the melting point of pure ice. Practically, to allow temperature differences for accomplishing the heat transfer, this temperature range will be somewhat higher than the depression of the freezing point. In any case, this temperature range controls on the vapor pressure curve of butane, the pressure range, and thus the compression ratio of the turbo-compressor used.

*Flash Chiller.*—The condensate, butane, and the desalted water, originally present in the ice slurry plus the water which is formed by melting the ice, all at a temperature of 35° F., are decanted near the bottom of the Main Condenser and discharged in separate streams. This butane liquid is recycled to the Evaporator-Freezer. It has been found desirable in operation to pre-chill it to the temperature there, 26.3° F. This is done by passing the decanted butane liquid to a flash drum or Flash Chiller maintained at the pressure of the Evaporator-Freezer. A vapor connection outlet of this Main Chiller allows the vaporous butane formed in this flash evaporation and self cooling to pass to the suction of the Main Compressor. The liquid butane is passed below the surface of the brine to the agitated Evaporator-Freezer and is thoroughly mixed therewith as it rises and evaporates. This evaporation then removes heat from the sea water to freeze more ice which continues the process.

*Auxiliary Compressor and Auxiliary Condenser.*—The evaporating-compressing-condensing actions with the butane in the Evaporator-Freezer, the Main Compressor and the Main Condenser are thus seen to encompass a refrigeration cycle, wherein the boiling of the butane liquid freezes water, the vapors of butane so formed are compressed to give a higher saturation pressure, and hence temperature, to allow heat transfer and condensation. This then melts the ice originally formed which is separated in the Ice Separator, and cycled to the Main Condenser.

Due to thermodynamic inefficiencies, there will always be more butane vapor entering the Main Condenser, 8 to 8.5 tons per hour, than the amount which can condense therein in melting the ice, which is about 5.9 to 6.1 tons per hour. This excess thermodynamic vapor, 2.1 to 2.4 tons per hour, leaves the top of the Main Condenser; and it must be compressed to a somewhat higher pressure, in an Auxiliary Compressor. This also has a comparatively low compression ratio, 1.94, which is, however, somewhat higher than that of the Main Compressor. (In experimental practice this varied from about 1.8 to 3.0 depending on the means of cooling the Auxilary Condenser.) This ratio varied because it compensates for all variations in temperatures, flow rates, etc. in the whole operation. In the experimental plant operation this was an 8 cylinder reciprocating compressor which had wide latitude to compensate for inefficiencies elsewhere in the system. It is diagrammed in FIGURE 5 as being steam driven, but it may also be an electrically driven reciprocating unit, a turbo-compressor, or other unit which would satisfy the specifications.

There is a direct contact of vapors in the Auxiliary Compressor with a cooling stream. This cooling fluid may be one of the chilled streams, i.e. the desalted fresh water or brine leaving the system. Alternately, depending on the heat balance, it may be cooling water, or raw sea water, not otherwise used. The path of the cooling medium is not shown.

This Auxiliary Condenser is designed for direct contact, as in the Main Condenser with lower decanter for separate discharge of liquid butane and cooling fluid. An indirect heat transfer surface of 150 square feet through which may be circulated cooling water is also incorporated as shown in this Auxiliary Condenser for use as needed.

The Auxiliary Condenser discharges non-condensible gases through a Vent, the final discharge of the system purging the system.

The condensate of butane liquid from the Auxiliary Condenser must be cooled to its approximate boiling point at the pressure of the Evaporator-Freezer. This is done by passing it to the Flash Chiller.

Since the liquid butane leaving the Auxiliary Condenser is at a higher temperature than that from the Main Condenser, the amount of vapor formed per pound butane liquid passed to the flash evaporation and cooling will be greater for this condensate, this butane vapor discharges to the suction of the Main Compressor. Alternately, there may be an Auxiliary Chiller used which would handle this stream of condensate from the Auxiliary Condenser independently, since it operates over a different range of pressures.

*Liquid-Liquid Heat Exchangers.*—The concentrated brine, which is formed in the Evaporator-Freezer by the freezing of water leaves at the temperature of freezing of this, the most concentrated salt solution, 25 to 26° F. The chilling effect of this cold brine is utilized by passing from the Evaporator-Freezer or from the Ice Separator or from both to the No. 1b Heat Exchanger and therethrough counter current to a gasoline stream used as a heat carrying medium.

The No. 1b Heat Exchanger is a vertical cylindrical vessel about 3 feet in diameter by 13 feet high. It has a series of disks on a shaft rotating on the axis to give agitation and contacting, also horizontal baffle rings inside the shell between the disks to break up the circulation. A stream of gasoline at a temperature of about 54.5° F. circulates in from the bottom; and because it is lighter than the brine, it rises counter-currently through the Heat Exchanger, giving up its sensible heat to the brine. The cold brine from the Evaporator-Freezer entering near the top settles downwardly and is warmed correspondingly. The cooled gasoline at about 38.5° F. goes out of the top; and the warmed brine discharges from the system at the bottom at about 50° F. Alternately it may be used for additional cooling in the Auxiliary Condenser or elsewhere.

Similarly the desalted water discharged from the Main Condenser at its low temperature, about 35° F., is passed into the top of the No. 1a Heat Exchanger. This has the same dimensions as the No. 1b Heat Exchanger. The desalted water is also heated to about 50° F. with a stream of gasoline as a heat carrying medium.

The No. 2 Heat Exchanger is the same rotating disk-stationary ring type of liquid-liquid contactor. It is a vessel about 3 feet in diameter by 16 feet high. It receives the streams of chilled gasoline from both the No. 1a Heat Exchanger for desalted water and the No. 1b Heat Exchanger for waste brine. The combined stream of chilled gasoline is passed in at the bottom of the No. 2 Heat Exchanger, while raw sea water comes in the top of the tank of Heat Exchanger 2. The sea water goes out the bottom cooled to a temperature of 10° C., while the warmed gasoline recycles from the top, back to the bottom of No. 1 and No. 2 Heat Exchangers.

The desalted water discharged is flashed in the Auxiliary Condenser or elsewhere to remove the trace of hydrocarbon, either gasoline or butane dissolved therein. It is potable, and in practice would be less than 300 p.p.m. total solids. No carry-over of solids has been found due to solution in the gasoline or otherwise, from the brine stream of Heat Exchanger 1b or the sea water stream of Heat Exchanger 2 to the fresh water stream of Heat Exchanger 1a.

The gasoline used as the heat transfer fluid is a specially refined, acid and alkali washed fraction to remove taste and odor-giving constituents. A higher boiling naphtha or petroleum fraction has been found preferable in some cases as it gives slightly less solubility (usually about 0.01 to 0.1%) in the water produced and, because of its lower vapor pressure, precludes the necessity of flashing the fresh water to remove the petroleum fraction, which is almost unnoticeable.

In either case, the contacting of the water and of the brine by the petroleum fraction extracts therefrom the butane dissolved therein. This is a very small amount, but it is recovered periodically by a distillation of a small stream of the petroleum fraction used as a heat carrying fluid in a continuous rectification column of 10 to 20 bubble cap trays heated by a steam coil or otherwise at the base, from which the stripped petroleum fraction discharges for recycle. There is a recovery of the butane by condensation, and this butane passes back to the Evaporator-Freezer.

*Energy Consumption.*—The total energy consumption of the Compressors liquid transfer pumps, Ice Separator and rotating disk Heat Exchangers in a plant of this size is approximately 30 kwh. per 1000 gallons of water produced of 300 p.p.m. of solids or less. In a larger plant, where the rotating units will have a greater net efficiency and the unit heat losses or gains are less, the unit power consumption will be less—as low as 15–18 kwh.

EXAMPLE OF OPERATION OF SIMPLIFIED PLANT FOR SEA WATER CONVERSION (FIGURE 6)

Figure 6:
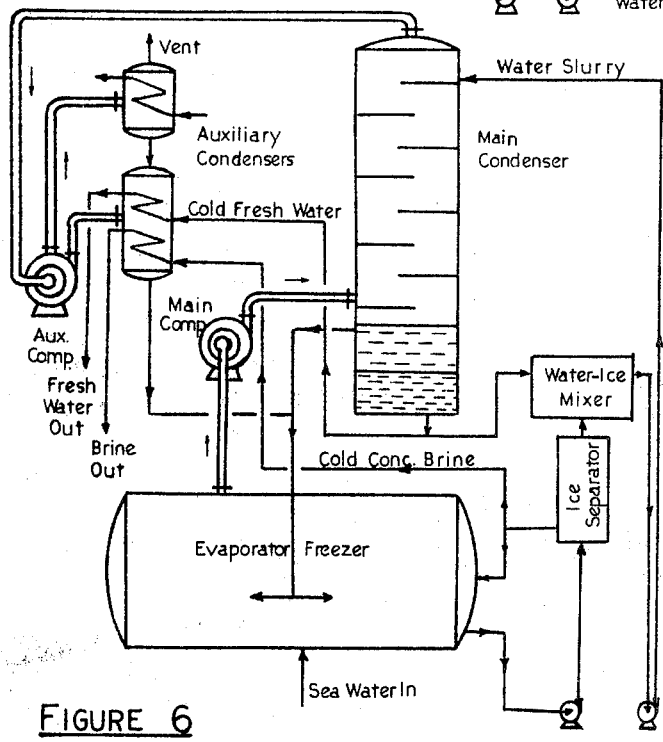
FIGURE 6 is another diagrammatic embodiment of a flow sheet of a form of the invention, wherein the dewatering plant is small in size; and equipment cost and simplicity are of more importance than minimum energy cost in operation.

FIGURE 6 represents a flow diagram of a modification of the process shown in the flow diagram of FIGURE 5 without the use of Heat Exchangers to transfer to the inlet sea water the chilling effects of the cold fresh water product and of the cold brine leaving the system. This flow diagram of FIGURE 6 would suffice for an installation of relatively small capacity, wherein simplicity of operation and lower plant cost might be more important than highest efficiency. In this example, chilling action on the flow of raw sea water in the Evaporator-Freezer necessary to reduce its temperature to the freezing point is accomplished entirely by the refrigeration effect therein. Also, there is no Flash Chiller for the butane liquid between the Main Condenser and the Evaporator-Freezer. As mentioned above, an expansion or evaporation valve or an inverted syphon trap of adequate height would suffice.

The Auxiliary Condenser is shown as divided between two vessels; the lower one has two streams of cooling fluid, one the cold fresh water product and the second is the concentrated brine discharge. The lower Auxiliary Condenser may be divided further, if desired, into two vessels, one for each of these streams of cold liquids. The upper Auxiliary Condenser has cooling water which may be raw sea water, if that is the best fluid available as a coolant stream.

While the Auxiliary Condensers in FIGURE 6 and also as shown in FIGURE 5 are diagrammed as having usual tubular heat transfer surfaces, they may also be direct contactors, such as the baffle plate tower of the Main Condenser of each of these figures, or a chamber for a spray of the respective condensing stream into a volume of the compressed butane vapor. Here would be required again a decanter for the two fluids at the bottom as is a part of the Main Condenser.

Condensate from the higher pressure, upper Auxiliary Condenser, passes directly back through an evaporation valve to the lower Auxiliary Condenser; and condensate from here passes directly back to the Evaporator-Freezer, without benefit of a Flash Chiller as in FIGURE 5 to flash cool this liquid stream.

The added energy cost by operation according to the flow diagram of FIGURE 6 instead of according to FIGURE 5 is from 25 to 40% in plants of the same capacity.

The Auxiliary Compressor is indicated in FIGURE 6 as having two discharges, one at a higher pressure for the upper Auxiliary Condenser which operates at a higher pressure because of the higher condensing temperature necessary, while the lower Auxiliary Condenser is supplied at a lower pressure because of the lower pressure required with these cooling streams of lower temperatures. The Auxiliary Compressor, instead of being a two-stage unit as indicated with a partial withdrawal of butane vapor from the first stage for the lower Auxiliary Condenser, may be, instead, two separate compressors. Alternately the Auxiliary Compressor may have only a single discharge pressure, the relatively higher pressure required for condensing some of the vapors with the cooling water. This is the simpler system requiring, however, somewhat more work in compression.

Figure 7:
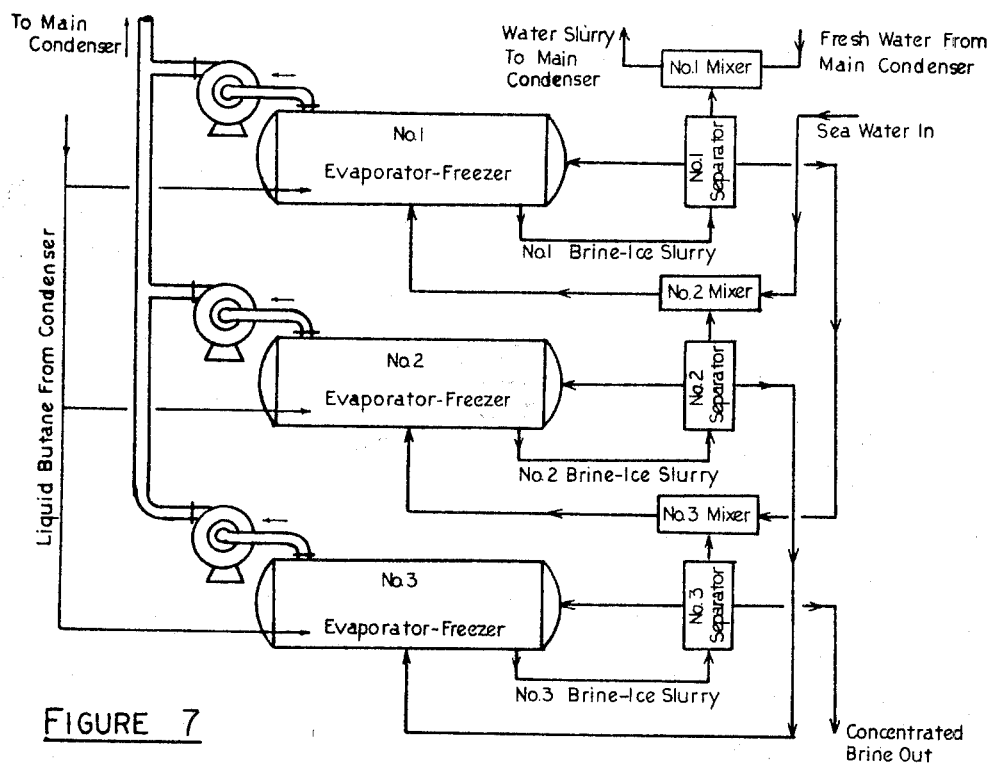
FIGURE 7 is a diagrammatic flow sheet of a part of a relatively large plant for accomplishing the process of the invention, wherein advantage is taken of the lower energy cost possible in multi-staging the operation in the Evaporator-Freezer and several immediately adjacent parts of the plant.

EXAMPLE OF OPERATION OF PLANT FOR SEA WATER CONVERSION USING MULTIPLE STAGE FREEZING (FIGURE 7)

FIGURE 7 represents a three-stage freezing unit for a very large installation, wherein it is worthwhile to take advantage of the difference of freezing temperatures of brines of different concentrations. In the continuously operating processes of FIGURES 4, 5, and 6, all of the freezing of ice takes place at the concentration of the most concentrated brine, i.e. that discharged from the system.

However, much ice may be frozen at a higher temperature, i.e., at a lesser depression of the freezing point, by freezing a brine at a lesser concentration, in a first vessel; and additional amounts of ice may then be frozen in successive vessels at the successively lower freezing temperatures of increasingly higher concentrations, until there is reached the lowest temperature of the final brine discharge.

FIGURE 7 represents three stages of such freezing, although any practical number of stages may be used, as mentioned below. Here, the sea water enters the system by being used to make a slurry of the ice crystals from the Number 2 Mixer, entering the Number 1 Evaporator-Freezer which functions in the manner already described. The Number 1 Brine-Ice Slurry outlet passes to the Number 1 Separator, where the ice crystals are separated and washed as before. They are then passed to the Number 1 Mixer where they are reslurried with chilled fresh water carrying them to the Main Condenser as usual.

A part of the filtrate from the Number 1 Separator goes back to the Number 1 Evaporator-Freezer, and a part goes to the second stage by way of the Number 3 Mixer where a slurry is made of ice discharged from the Number 3 Evaporator-Freezer. This slurry passes to the Number 2 Evaporator-Freezer.

The Number 2 Brine-Ice Slurry passes to the Number 2 Separator, the filtrate goes partly back to the Number 2 Evaporator-Freezer and partly to the Number 3 Evaporator-Freezer directly.

The brine thus becomes more concentrated successively in Evaporator-Freezers, 1, 2, and 3; and the ice formed as smaller crystals in the third stages goes successively to the second stage where these crystals grow, then the first stage, where they grow larger, and finally to the Number 1 Mixer where the largest crystals are reslurried with fresh water from the Main Condenser. The crystals not only grow in size; but by being continuously slurried with less concentrated brine, they require only about one-third to one-half as much fresh water wash to make potable water as did those formed in the example of the flow sheet of FIGURE 5.

Since the ice crystals are substantially pure; and since there is practically no change of freezing temperature with moderate changes of pressure, there is no similar advantage possible by multi-staging on the melting side of the refrigeration cycle.

The Compressors must each discharge therefore to a common pressure manifold, although that of Stage 2 will have a lower suction pressure than for that of Stage 1; and the suction pressure of the Compressor for Stage 3 will be still lower. Thus, the difference of energy per pound of ice produced represented by these higher pressures of Stages 1 and 2 as compared to the pressure of Stage 3 indicates the saving of energy made possible by multi-staging. A single stage would have its pressure that of Stage 3—corresponding to the freezing temperature of the most concentrated brine.

FIGURE 7 does not show a Flash Chiller for the returning liquid butane for cooling it from the higher temperature of the condenser. One for each stage may be used in parallel, each discharging the vapors produced in the section of the Compressor for that stage.

A slight gain in thermodynamic efficiency is achieved by multi-staging these Flash Chillers in Series. The additional equipment is obvious without being shown, and *all* of the liquid butane from the Main Condenser passes to a Flash Chiller operating at the pressure of the Number 1 Evaporator-Freezer; and the vapors produced here go to the Compressor for this stage. Part of the chilled liquid butane produced goes to the Number 1 Evaporator-Freezer; and that part not required there goes to a Second Stage Flash-Chiller which passes vapors to the suction of its compressor and part of its twice-chilled liquid butane to the Number 2 Evaporator-Freezer. The balance of the chilled liquid butane from this second stage Flash Chiller goes to the Third Stage Flash Chiller which passes vapors to the suction of its Compressor, and its triple-chilled liquid butane to the Number 3 Evaporator-Freezer.

This multistaging requires three successive separations of the ice formed in the Number 3 Evaporator-Freezer. However, that formed in the Number 2 Evaporator-Freezer requires only two separations, and that formed in Number 1 Evaporator-Freezer requires only one separation. This additional processing is warranted by the improved purity and washing as well as the larger size of the crystals. The total volume of the three stages has been found to be somewhat less than that of a single stage for the same production.

In a sea water conversion plant, the use of three stages may show an economy of from 15 to 30% as compared to a single stage process shown in the flow diagram of FIGURE 5. A very large installation would warrant this additional complication and equipment cost.

Multistaging allows a single sea water conversion unit to have a great capacity, since it is the Compressor which limits size in practice. For single units over about 5,000,000 gallons of water frozen per day, multistaging becomes quite economic; and over about 10,000,000 g.p.d. multistaging becomes always more economic with four or even five stages at larger capacities.

In FIGURE 7, the vapors are not recompressed, i.e. they pass through all condensers in parallel. However, if the energy advantages of multistaging are desired at capacities within the volumetric capacities of a single compressor, it may be economic to have the third stage compressor discharge into the vapor space of the second stage and then pass through its compressor, discharging ultimately through the first stage. This allows a lower compression ratio for the higher pressure units with a corresponding increase in compression efficiency. Furthermore, this system has been found to be particularly suitable for operation with those industrially occurring solutions wherein a higher concentration of the concentrated solution is desired (either of sodium chloride or other solute); and the overall depression of the freezing point thus requires a pressure range so high across the compressor handling vapors from the final Evaporator-Freezer that multistaging is desirable.

Another method of operating the multi-stage process of FIGURE 7 is to withdraw fresh water from the Main Condenser to each of the No. 1, 2 and 3 Mixers and to pass the water slurries so formed with ice from each to the Main Condenser. This obviates the necessity of handling the ice crystals more than once.

Some of the advantages of the multi-stage Evaporator-Freezer in crystal growth, but not in thermodynamic efficiency on the compression, may be secured by building into a single vessel a series of baffles to divide it into chambers. Then the dilute brine is fed into the first chamber, partly frozen, overflows to second, etc., down to the final chamber where it discharges. The common discharge of butane vapors gives a common pressure. There is a higher temperature differential and hence rate of growth in the first chamber than would be obtained without the "cells" given with the baffles. Careful control is required to prevent too great a build-up of new crystals as new nuclei.

EXAMPLE OF ENERGY REQUIREMENTS

For a plant producing 1,100,000 gallons fresh water from sea water, operating according to the process flow diagram of FIGURE 5, there is presented below the approximate heat or other energy quantities which are involved in each operation when isobutane is used as the refrigerant fluid. (Minor deviations such as those due to differences in densities, heats of solution, etc. are not always corrected.) These heat quantities represent the enthalpy or number of B.t.u. present in the liquid or vapor streams above 32° F. In those cases where the temperature is below 32° F. the heat quantity is indicated by a minus sign. The reference state is thus the liquid phase, brine, isobutane, or water at 32°.

The flow rate is given in millions of pounds per hour; thus the total heat energy involved in millions of B.t.u. per hour is:

(lbs. $\times 10^6 \times$ specific heat $\times$ diff. in temp. in ° F.)

In those cases of latent heat quantities either vaporization of isobutane, or freezing of water, the quantities are also indicated.

In the above thermodynamic heats the desalted water is assumed as 0% salt, since the 300 to 500 parts per million total solids, actually present does not differentiate it from pure water for these calculations. Also corrections are not always made for the slight difference in densities of the dilute solutions.

valve to cool the condensed refrigerant (at 68° F.) to the Main Condenser temperature, 33.8° F.

enthalpy of
  isobutane liquid at 68° F. = .349 ×10$^6$ B.t.u./T.
enthalpy of
  isobutane liquid at 33.8° F. = .3075×10$^6$ B.t.u./B.
                  Difference = .0415×10$^6$ B.t.u./B.

$$43.65 \times .0415 \times 10^6 / .305 \times 10^6 = 5.94 \text{ (T./H.)}$$

*Energy requirements—sea water desalting plant for 1,100,000 g.p.d. fresh water from 2,200,000 g.p.d. sea water*

| Symbol | Item | Flow Rate, Million Lbs./Hr. | Concentration, Wt. percent | Temp., °F. | Temp. Diff. from 32° F. | Specific Heat | Heat Millions of B.t.u., per Hr. |
|---|---|---|---|---|---|---|---|
| $H_1$ | Sea water charge | .7494 | 3.2 | 59.0 | 27 | 0.96 | 19.36 |
| $H_2$ | Fresh water discharge from heat exchanger | .3746 | [1] 0 | 50.0 | 18 | 1.00 | 6.75 |
| $H_3$ | Brine discharge | .3746 | 6.4 | 50.0 | 18 | 0.92 | 6.22 |
| $H_4$ | Sea Water discharged from heat exchanger | .7494 | 3.2 | 37.7 | 5.7 | 0.96 | 4.07 |
| $H_5$ | Fresh water from condenser to heat exchanger | .3746 | 0 | 32 | 0 | 1.0 | 0 |
| $H_6$ | Brine from freezer to heat exchanger | .3746 | 6.4 | 25.34 | −6.67 | 0.92 | −2.29 |
| $H_7$ | Sea water from heat exchanger cooled to freezer temperature. | .7494 | 3.2 | 25.34 | −6.67 | 0.96 | −4.79 |
| $H_8$ | Latent heat of ice produced in freezer | .3746 | | 32 | 0 | 144 | 54.2 |
| $H_9$ | Sensible heat of ice | .3746 | 0 | 25.34 | −6.67 | 0.96 | 1.27 |
| $H_{10}$ | Agitator energy input | [2] 50 | | | | | .1705 |
| $H_{11}$ | Pump energy input | [2] 120 | | | | | .409 |
| $H_{12}$ | Heat leak from the surface of the apparatus | | | | | | .994 |
| Heat to be absorbed in freezer by evaporated iso-butane = $H_4+H_8+H_{10}+H_{11}+H_{12}-H_7$ | | | | | | | 64.53 |

[1] Concentration of desalted water for thermodynamic purposes of 0% salt.
[2] (kw. h.).

*Energy requirements—sea water desalting plant for 1,100,000 g.p.d. of fresh water from 2,200,000 g.p.d. sea water*

Quantity of isobutane to be evaporated in Evaporator-Freezer (latent heat of isobutane at 25.34° F. = .309 × 10$^6$ B.t.u./T. =

$$\frac{64.53 \times 10^6}{.309 \times 10^6} = 208.7 \text{ (T./H.)}$$

Quantity of isobutane to be evaporated at expansion valve in vapor line from Main Chiller to cool the condensed isobutane (at the Main Condenser temperature, 35.6° F.) to the freezer temperature (25.34° F.)

enthalpy of isobutane liquid at 35.6° F. = .312×10$^6$ B.t.u./T.
enthalpy of isobutane liquid at 25.34° F. = .298×10$^6$ B.t.u./T.
                Difference = .014×10$^6$ B.t.u./T.

$$208.7 \times .014 \times 10^6 / .309 \times 10^6 = 9.45 \text{ (T./H.)}$$

Total isobutane gas to be compressed in the Main compressor $$208.7 + 9.45 = 218.15 \text{ (T./H.)}$$

Energy of cooling isobutane vapor leaving Main Compressor at 35.6° F. to the condensing temperature (33.8° F.)

enthalpy of
  isobutane gas at 35.6° F. = .3115×10$^6$ B.t.u./T.
enthalpy of
  isobutane gas at 33.8° F. = .308 ×10$^6$ B.t.u./T.
                   = .0045×10$^6$ B.t.u./T.

$$H_{13} = 218.15 \times .0045 \times 10^6 = .981 \times 10^6 \text{ (B.t.u./H.)}$$

Quantity of condensing isobutane in the Main Condenser (latent heat of isobutane at 33.8° F. = .305×10$^6$ B.t.u./T.).

$$H_8 - H_{13}/.305 \times 10^6 = 174.5 \text{ (T./H.)}$$

Quantity of isobutane vapor leaving Main Condenser and passing to the Auxiliary Compressor and Auxiliary Condenser $$218.15 - 174.5 = 43.65 \text{ (T./H.)}$$

Quantity of isobutane to be evaporated at expansion

Total quantity of isobutane vapor to be compressed in the Auxiliary Compressor $$43.65 + 5.94 = 49.59 \text{ (T./H.)}$$

Energy (W) required by the Main and Auxiliary Compressors: where $$W = .0304 \times P(\text{p.s.i.}) \times V(\text{ft.}^3/\text{lb.})$$
$$\times n/n-1 \times (\text{c.r.}^{(n-1)/n} - 1)$$

| | Main Comp. | Aux. Comp. |
|---|---|---|
| Pressure, P, p.s.i. | 19.49 | 23.9 |
| Volume, V, cubic ft./lb. | 4.335 | 3.61 |
| Compression ratio, c.r. | 1.23 | 1.94 |
| Heat capacity ratio, n | 1.11 | 1.11 |
| Flow rate, T./H. | 218.15 | 49.59 |
| Efficiency, T. | 90 | 80 |
| Energy, W, HP | 831 = $W_{main}$ | 566 = $W_{aux}$ |

Total required energy:

$$W_{main} + W_{aux.} + H_{10} + H_{11} = 1.622$$

(H.P.H.) or 1,210 (kw.h.)

Energy requirement per ton of fresh water:

1,622/187.3 = 8.67 H.P.H./T. = 6.46
                kw.h./T. = 26.9 kw.h./1,000 gallon

DYNAMIC FREEZING IN COMMERCIAL APPARATUS

The freezing has been explained above. The operation of the Evaporator-Freezer requires a layer of butane liquid on top of a layer of brine, also an agitator which mixes the butane liquid, as dispersed drops or larger masses, down into the brine liquor which is the continuous phase. The maximum depth to which the butane is forced down into the brine should be such that the total hydrostatic head of butane plus brine would be not more than 100 mm. of mercury, and it is preferred that this hydrostatic head be not over about 30 mm. of mercury. All this is depicted diagrammatically in FIGURE 11.

If boiling occurs below the liquid depth corresponding to this hydrostatic head, the corresponding temperature difference is so high that a very large amount of heat is removed from the brine, particularly in the upper part thereof; and this causes a large amount of supercooling and hence a large rate of freezing. This results in very small ice crystals. These will not grow to the desired size within a reasonable time in the process. If boiling does not occur at some lower level to which butane is forced due to the operation of the compressor at a modate suction pressure, the agitation effect is wasted; unnecessary power is consumed; and the energy given up thereby must be removed.

The rate of operation has thus been found best with a temperature difference on the butane vapor pressure curve equal to a maximum hydrostatic head of not more than 30 to 100 mm. of mercury, below which evaporation of butane or freezing of ice cannot take place.

Below the depth of the agitated butane in the brine, there is, however, additional brine which does not have butane liquid in contact therewith; and in this brine crystals are growing, as depicted diagramatically in FIGURE 11. Also new small nuclei are forming to give the correct number of crystals to build up to the desired size, average of 0.3 mm. to 0.7 mm. size, with the time of residence in the vessel. The average holding time in the vessel of the brine should be at least about 30 minutes; but if a smaller crystal is desired, this time may be reduced. While the maximum crystal size may be built up to 1 mm. or even more, this takes more time and hence lowers capacity. The optimum economic size is from 0.3 to 0.7 mm.

The agitation may extend to substantially all of the brine in residence. Below the level to which butane is forced, there is still agitation which is effective in mixing the brine and helping the ice crystals to grow, but which is not effective in bringing butane down to the lower levels.

Agitation is necessary because there is a large difference in the densities of the brine and the butane and also the butane is evaporating into bubbles within a butane liquid droplet dispersed within the brine; this lowers the effective density tremendously and tends to cause the mixture of butane liquid and vapor to rise faster through the brine. Hence, agitation is controlled by the desired rate of operation; and if a faster rate is desired, and more vapors of butane are formed in the butane drops drawn beneath the surface of the brine, the agitation rate must also be increased.

In the experimental operation of this invention it has been found that the maximum amount of the butane which should be present is the maximum which will be completely dispersed by the agitator into the brine phase. Larger amounts forming a thick upper phase of butane are not desired, and merely add to the total hydrostatic head.

The total hydrostatic head on the lowest butane droplets has been found to be desirably not less than about 10 mm. of mercury, if less, the capacity of the unit is reduced to an uneconomic level. Hence, the preferred range is from 10 mm. to 100 mm. of mercury. The best level, for most solutions, from a balance of the several effects, has been found to be about 30 mm. of mercury.

Thus a major feature for large operation of the present invention, is the use of an Evaporator-Freezer wherein a total depth of the liquid is not over about six feet, although normally in building a large vessel for processing very large quantities, e.g., millions of gallons of water per day, an Evaporator-Freezer might be used of considerably greater depth as would be more economic of construction cost.

The combination of agitation, butane-brine mixing, feed rate of dilute brine, discharge rate of brine-solid slurry, ratio of butane to brine present, are all important in this control of number and size of crystals. It should be noted that the ice crystals have a considerably lower density than does the brine; and the butane is much lighter than either.

THE USE OF ABSORPTION REFRIGERATION INSTEAD OF COMPRESSION REFRIGERATION

In the above described processing, the use of the more or less well known process of mechanical refrigeration has served to evaporate and freeze ice in the Evaporator-Freezer while it condensed and melted the ice so formed in the Main Condenser.

It has also been found possible to use the absorption process of refrigeration in this invention; and this may often be done quite desirably under those conditions where mechanical energy is less readily available than thermal energy, particularly if low temperature thermal energy is cheaply available, as for example, exhaust steam. This alternate absorption refrigeration method of operating this invention is clearly illustrated in the process shown in the flow sheet, FIGURE 8.

Herein is the same Evaporator-Freezer operating at more or less the same temperature as in the previous examples with butane, evaporating and passing these vapors from the Evaporator-Freezer to the Absorber which is a direct contacting device. The vapors enter the Absorber, and the water-ice slurry enters near the top, as does also fresh absorber liquid.

As in the previous Main Condenser, there are two liquid phases, i.e., a hydrocarbon phase and a water phase. The ice phase disappears in the water in passing from the top to the bottom.

Butane is absorbed in the absorbent liquid which is chilled by the refrigerating effect of the melting ice in direct contact therewith to accommodate the heat of condensation of the butane vapor. Thus, no cooling coils or other similar indirect cooling devices are necessary, as are usually used in absorption columns to remove the heat of condensation of the absorbed material.

While the absolute pressure in the Evaporator-Freezer is only sufficiently higher than that in the Absorber to allow flow of vapors in this embodiment of the invention, the vapor pressure of the refrigerant fluid, butane, is lowered in the Absorber by the absorption oil so that the butane vapor is absorbed.

The recycliing absorbing liquid thus effectively removes butane gas fed in from the Evaporator-Freezer by dissolving it in the Absorber which then forms an upper layer in the Decanter at the lower part of the absorber and the heat of condensation is given up to melt the ice crystals in the water-ice slurry. The water passes to the bottom, is decanted, and is recycled to the Water-Ice Mixer partly to make more water-ice slurry, and part of its is drawn as the fresh water product as before. The ice separation and melting sequence is operated the same as before.

The butane-absorbent oil solution is withdrawn, passed through a Pump which brings it to a higher pressure of a Heat Exchanger and the Stripper Column. This column is operated with either direct or indirect heat from steam or other heating means. The Stripper Column is a distilling column of plate or other standard type. The butane gas is stripped at the top at the higher pressure of its operation; the Absorber oil is exhausted at the bottom and is at a higher temperature than the feed liquid. It passes through the aforementioned Heat Exchanger to the top of the Absorber Column.

This Heat Exchanger may be a direct contact Heat Exchanger if desired, wherein water or brine is used as the heat transfer medium in a pair of Heat Exchangers similar to that of FIGURE 3.

The butane gas withdrawn from the top of the Stripper Column is condensed and withdrawn largely as product; although a small amount may be recycled back to the top of the Stripper Column as reflux. This butane liquid then may pass through a Chiller as used before to enter the Evaporator-Freezer at the lower pressure and temperature there.

Figure 8:
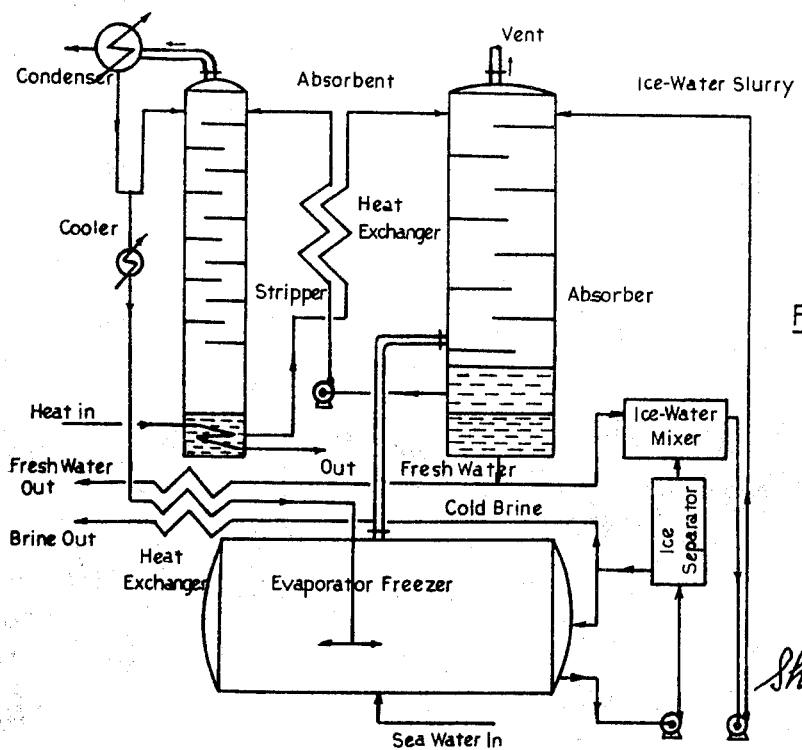
FIGURE 8 is a diagrammatic flow sheet using an absorption refrigeration for the essential freezing operation.

As shown in FIGURE 8, however, there is another Heat Exchanger to chill the recycle absorber oil by means of the chilling effect of the streams of cold brine and of the cold fresh water discharging from the system. Here again, either a standard shell and tube heat exchanger or a direct contact unit such as is shown in FIGURE 3 may be used. The combination shown in FIGURE 5 may also be used with two units 1a and 1b chilling the gasoline, and a single unit (2) chilling the absorber oil. Another such arrangement may be used to pre-chill the entering sea water, depending on the relative temperatures, and hence heat capacities of these streams.

By choice of the properties of the Absorber Oil and of the operating pressure of the Stripper Column, the heats of the Condenser at the head can be taken care of through utilizing ordinary cooling water temperatures (saline water if no other material is available). On the other hand, it is apparent that there may often be more than one stage in the system; and that there will be an Auxilliary Absorber connected to the Vent of the Main Condenser and operating as a second stage, just as there was an auxiliary Compressor in the flow process of FIGURE 5. In this case the cooling effect in the Auxiliary-Absorber (not shown in FIGURE 8) will be supplied by a stream of cooling water—at a higher temperature.

In this case the operation of the first stripper or main stripper will be at a lower temperature and pressure using, for example, the chilling effects of the fresh water stream and of the brine stream. An auxiliary stripper may or may not be used which would utilize the ordinary cooling water or whatever temperature cooling stream might be available in in ordinary operation. This would be at a higher pressure, the same as the Auxiliary Compressor in the process flow sheets of FIGURES 3, 4, or 5 delivered a higher pressure. Similarly there would be desired another heat exchanger in this auxiliary stripper system.

This arrangement using the absorption refrigeration system may be a series or a parallel operation of stages in the Evaporator-Freezer, as shown, for example, in FIGURE 7.

CHOICE OF THERMODYNAMIC AGENT

In the above description and examples, it has been noted that the best thermodynamic agent is one which has a normal boiling point at or about the freezing temperature of the solvent so that the operation can be conducted almost at atmospheric pressure or slightly above.

An optimum thermodynamic agent should also include other desirable properties, including the economic one of low cost. This largely limits the choice of hydrocarbons, chlorinated hydrocarbons, or chlorofluorinated hydrocarbons, etc.; but their cost is much greater. In some cases, ammonia, carbon dioxide, carbon disulfide, the oxides of nitrogen, and other inorganic compounds may be used in special applications. Propane may be used; and it has some advantages from the standpoint of thermodynamic compression energy requirement; in this case with water as the solvent the operation would be at a pressure considerably higher than atmospheric. In using propane, however, there is the severe disadvantage of the ready formation with water of propane hydrate, which hydrate may come out as a crystalline combination between the propane and the water of varying ratios of water to propane. This interferes with the separation process since some propane is carried along with the ice. This formation of hydrates extends over a wide range of concentrations of brines or other aqueous solutions from which it is desired to freeze ice for the process of this invention. Furthermore, the equilibrium temperature of forming the hydrate of a hydrocarbon is always higher than the freezing point of water out of the same brine. Also the conditions of hydrate formation are difficult to evaluate exactly; and often hydrates may form unpredictably from mixture and under conditions seemingly immune to such formation.

Hence, for the successful operation of this process, it is of very great advantage to use a thermodynamic fluid which cannot form hydrates under any conceivable conditions of operation.

Although in the above examples, normal butane has been given, and normal butane has been used very effectively, it has certain disadvantages; (a) it is expensive because of the separation processes involved in obtaining it from petroleum products, and (b) it has a slightly lower vapor pressure than would be most desirable in this process.

However, normal butane has the major advantage that it does not form hydrates under conditions of the present operations. Carefully controlled experiments have shown definitely that no hydrate of normal butane exists with water within the saturation pressure range of normal butane.

Also, it has been established definitely by carefully controlled experiments that hydrates do form with isobutane; and they cause a severe disadvantage in the operation due to their presence under some conditions as very small crystals. Also, under slightly different conditions, there is great difficulty in operation due to the viscosity of the liquid solution which results from the formation of the hydrate which remains in solution.

The exact analysis of the amount of hydrate remaining in solution and the determination of the phase diagrams as such is difficult; and these solubility determinations have never been made.

With mixtures of isobutane and normal butane, it has been found that a relatively small amount of normal butane mixed with isobutane will completely prevent the formation of hydrates under all conditions of temperature, pressure and concentration of brine encountered. It has been found that if the liquid mixture contains more than about 15% normal butane, no hydrate forms.

A good method of studying hydrate formation is by measuring the vapor pressure of the hydrocarbon which is forming a hydrate.

In the case of a mixture of 5% of butane in isobutane, these vapor pressure relations are shown in FIGURE 9. Thus, the vapor pressure of pure isobutane is given in the top line; the vapor pressure line of normal butane is shown to be considerably lower; and the vapor pressure of the 95% isobutane-5% butane liquid mixture is given in the line slightly below that for iso-butane.

If there is any of this 95% isobutane, 5% normal butane present as such with brine and uncombined as hydrate, it will have a vapor pressure on this line. When a hydrate forms from an excess of aqueous liquid, the vapor pressure resulting is below that of the hydrocarbon liquid itself.

Four curves, much more steep, are shown intersecting the vapor pressure curve of 95% isobutane, 5% butane. These represent the pressures of the hydrate formed from different aqueous solutions of salt in contact with the mixture of liquid butanes. These curves are labelled with the respective percentage of sodium chloride in each solution.

The one to the right, zero percent sodium chloride, intersects the 95% isobutane curve at about 35° F. This means that the hydrate formed with the isobutane has a freezing point of about 35° F. and that the vapor pressure of the hydrate is the curve extending from the point A to point B. In the case of 1.615% sodium chloride solution, the curve is shown by the curve CD; for 5.11% sodium chloride solution it is shown by the curve EF; and for 7.91% sodium chloride solution it is shown by the curve GH.

The corresponding points B. D. F tnd H respectively indicate the freezing point of ice out of the solution which represents the equilibrium between the liquid solution, solid ice and solid hydrate. The extension of the curves, below this dotted line BDFH, represent the line of supercooling or instability (comparable to the line of vapor pressure of pure water below its freezing point).

In the area enclosed between points B, D, F, H, J, G, E, C, A, there is hydrate in equilibrium with the solutions or brines of the respective concentrations, since brine is in excess, and all of the hydrocarbon is combined. a very viscous liquid containing the hydrate results. This settles out as another layer on top of the brine.

The definition of the curve BDHJ comes from the known freezing point of ice out of brines containing the respective amounts of sodium chloride. Thus, the intersections of the several lines GH, EF, CD and AB with the ordinates representing the known freezing points of those concentrations of sodium chloride indicate the loci of these points, determining this line.

The freezing point equilibrium curve of ice from the salt solution intersects the vapor pressure curve of 95% isobutane, 5% normal butane at the point J. It thus is apparent from extensive experiments that any concentration of sodium chloride higher than that of a line through J would be free of hydrate formation. The formation range of hydrates is therefore ABJA. (The range of hydrate formation when propane is used is even larger.)

Another method of explaining this is by saying that when the escaping tendency or fugacity of the water out of the brine is less than that of the water out of the hydrate, no hydrate can exist. This limit is indicated by J.

In the case of mixtures of larger amounts of normal butane with isobutane, it has been found that when the amount of normal butane is more than about 15%, there will be no hydrate formation; the very large viscosity of the layer containing hydrates is no longer apparent; and the operation of the process proceeds very satisfactorily.

Under the conditions of freezing water out of brine, it is thus apparent that isobutane is the highest saturated hydrocarbon which forms hydrates under these conditions. However, it may be used very satisfactorily by incorporating at least 15% of n-butane with the isobutane used as the thermodynamic agent. The reason for this is dependent upon the vapor pressure and solubility relations of the mixture or solution of normal butane in isobutane.

Thus the preferred material for this operation is a mixture of isobutane with n-butane present to the amount of at least 15%. This preference is because: (a) the use of hydrocarbons gives a cheap, readily available fluid, (b) the use of isobutane with 15% normal butane gives the lowest boiling mixture of saturated hydrocarbons which does not form hydrates; (c) the vapor pressure at the freezing point of water and the usual aqueous solutions encountered is always near to, or slightly above, atmospheric pressure.

The presence of other materials in commercial grades of the butane fraction used such as the butanes, a small amount of propane, and small amounts of pentane might change this ratio of the amount of normal butane present slightly.

While normal butane itself, and in a relatively pure form, may be used, it has the disadvantage that the freezing temperature in the brine will be at a vapor pressure of the thermodynamic agent which is less than atmospheric. Theoretically this is no disadvantage, but practically it means that a slight vacuum in the freezing operation will cause any leaks to be from the outside into the system; and the usual disadvantages of operation with systems operating at sub-atmospheric pressure will be apparent. Hence, it is preferred to operate a refrigeration system wherein the lowest pressure is not below atmospheric; and this is secured by the use of a mixture of isobutane and n-butane.

Furthermore, it also follows that the volumes of vapor to be handled become larger with a material of a lower vapor pressure; and thus the suction volume of compressor must be larger if pure n-butane is used instead of the preferred mixture with not more than 85% isobutane.

For these several reasons, it is desired to use the mixture of normal butane in amounts at least of about 15% with the isobutane. Amounts of butanes, the unsaturated hydrocarbons having four carbon atoms, which are usually present in the normal run of refinery products in the boiling point range of the isobutane-normal butane mixture are perfectly satisfactory.

MISCELLANEOUS VARIATIONS IN THE INVENTION

There are many modifications of this invention as to process methods which have been found useful under particular conditions for the separation of concentrated liquors and substantially pure solvent from either naturally occurring solutions or those occurring in industry.

For example, this process may also be used immediately in the concentration of those solutions of non-volatile liquids as well as of solids as referred to more often herein for ease of explanation. Thus, for example, in the operation with aqueous solutions of glycerine and of sulfuric acid, two non-volatile liquors, ice crystals are formed; and the process proceeds just as with solutions of salt or other non-volatile solids. The freezing point lowering, and other physical considerations determine the design of identical processing equipment to that used with solutions of solids. The freezing point curves for water out of its solutions with sulfuric acid and with glycerol as shown by the dotted lines in FIGURE 1, indicate the same conditions pertain as will the solutions of solids.

Thus, while the term "solids" has been used on these specifications, a more general understanding of the invention is that it operates equally well with solutions of any non-volatile material, solid or liquid, in a solvent which can freeze under the temperature ranges of the described process.

Similarly, there has been indicated that this general invention is useful for separating from solutions many solvents other than water, and among the many examples are benzene, freezing at about 42° F. and acetic acid freezing at about 62° F. Suitable refrigerants selected outside of the organic or inorganic fluids, which are soluble in such solvents, would be utilized, ammonia (not with acetic acid), carbon dioxide, sulfur dioxide, the oxides of nitrogen, etc. The choice of refrigerant will be made based on its properties and those of the solvent.

In the conversion of saline water, where the ambient temperature is only slightly above the freezing point of water, the cold air of the atmosphere may be used advantageously in the removal of heat of vapors from the refrigerant vapors. If the ambient temperature is below the freezing point of ice from the saline brines, cold air may be cycled directly by means of a fan or blower to the heat exchanger or condenser which, in this case, might well be a tubular unit or other form of indirect heat exchanger. Similarly the saline water entering the system would be chilled approximately to the ambient temperature. Such a system would incorporate more or less of the steps already shown, although if this chilling effect were great enough, the requirements for the condenser, heat exchangers, etc. might be considerably reduced.

In the case of such low ambient temperatures, it is apparent that the operation of this refrigeration system for making fresh water will be tremendously less expensive than that of an evaporating plant; and if the temperature were higher than the freezing temperature of water, it still would be possible, by operating with a greater compression ratio on the Main Compressor, to simplify the plant and economize on the refrigeration power required. Thus, cold air, brine, or other naturally occurring cold materials, either solid or liquid or gaseous, might be incorporated in their use in this invention.

Also while it is usually preferred to operate with a thermodynamic fluid which forms no hydrates with any concentration of solution experienced, it has been found possible to operate with a hydrocarbon which forms hydrates up to a certain concentration; i.e., the concentration represented by point J, about 10% NaCl in FIGURE 9. If the concentration of the brine in the Evaporator-Freezer is above that corresponding to point J, no hydrates can form; and in this case, for example a mixture of 5% normal butane, 95% isobutane can be used. In starting the unit, to build up a concentration above the critical one at J, the amount of liquid thermodynamic liquid is reduced to practically zero, evaporation occurs on entry and a relatively inefficient operation is first experienced. When the concentration exceeds about 10% NaCl, the usual amount of thermodynamic liquid may be allowed to enter the system; and operation proceeds normally.

Similarly, while other and various designs of the several pieces of equipment have been suggested, this invention is limited only by the scope of the attached claims and not by any specific types of equipment which may be used within the spirit of the claims. Whereas a conical centrifuge has been mentioned, it is also possible to use a cylindrical type, either horizontal or vertical, or any other type of centrifugal machine which may be designed with arrangements for washing, or even counter-current washing therein, to minimize the additional amount of fresh water required in this washing operation.

The operation of the process to produce preferably crystals of 0.3 to 0.7 mm. represents a generally advantageous range for this invention, particularly for saline water conversion; and this relatively large size permits the economic use of a centrifugal separator, not possible in other processes of the prior art because of the small size of crystals obtained. In those cases where the rate of growth of crystals is slower, as for example in more viscous solutions such as those of sucrose, glucose, sulfite waste liquors, etc., it follows that the holding time in the Evaporator-Freezer will necessarily be longer.

The necessary size of crystal developed in the Evaporator-Freezer will be directly related to the type of centrifugal separator which is used and the force exerted. Usually it may not be necessary to use the centrifugal force of more than 50 times as great as the force of gravity; but here again a balance of wash liquor requirements, etc. may well be considered in the practical application of this invention. In every case, the invention produces crystals sufficiently large so that centrifugal machines may be used for this separation. This has been found possible by correct operation of the Evaporator-Freezer.

Also there has not been intended to be shown all the necessary valves, controls, minor accessories, intermediate process storage tanks, make-up tanks for butane, gasoline, etc. which the skillful engineer will incorporate in such a processing plant. In many cases, it may not be necessary to deaerate the feed water, but in other cases this processing step may be desirable and accomplished prior to the other processing steps of this invention. Any of the well known methods may be used.

While it has been indicated that there may be a small amount of refrigerant liquid leaving the system (usually a very small fraction of a percent) dissolved in the fresh water, and also in the salt brine, this may be extracted into the stream of hydrocarbon used in the direct contact Heat Exchangers. This may be distilled therefrom as indicated in the examples. In those few cases where gasoline or other low boiling hydrocarbon liquid is utilized in the direct contact heat exchangers, it may be desirable to vacuum flash or otherwise remove by standard methods the small amount of hydrocarbon (e.g. gasoline dissolved in these liquors to the extent of a very low fraction of a percent). Usually this may not be necessary, and it depends entirely upon the cost of the gasoline or other heat exchanging liquid used. The range of boiling point, hence vapor pressure, and hence solubility of the liquid used in the direct contact heat exchanger, may be varied over wide limits without affecting the practical application of this invention; and a balance between the desirable features of higher hydrocarbons against the desirable features of lower hydrocarbons will necessarily be made.

Also, for example, the Main Condenser has been specified as being desirably a unit which has very low pressure drop or substantially no loss of pressure throughout by having wide vapor passages feeding uniformly to a series of trays with water-ice slurry thereon. This advantage in minimizing the necessary output pressure of the Main Compressor may be balanced against the slightly higher cost that may result in the Main Condenser. The slightly higher cost of operation of a more nearly counter-current Main Condenser, or Absorber, may often be considered, depending on the cost of power.

I claim:

1. An apparatus for separating a solvent from a solution containing the solvent by direct contact with a volatile refrigerant immiscible with the solvent or solution comprising an evaporator-freezer, a line for delivering solution to the evaporator-freezer, a line for delivering a liquid refrigerant to the evaporator-freezer for direct contact with the solvent below the liquid level therein, said apparatus containing sufficient refrigerant to produce a layer thereof in liquid phase in interface contact with the body of solution in the evaporator-freezer, an agitator which mixes the liquid refrigerant at the top of the body of solution as dispersed drops down into the solution, a condenser, means for withdrawing refrigerant vapor from the evaporator-freezer and delivering it to the condenser whereby to evaporate the volatile refrigerant and produce a pressure and temperature in the evaporator-freezer to freeze solvent from solution, separating means for separating ice crystals from solution, conduit means for withdrawing a slurry of ice crystals and solution from the evaporator-freezer and deliver it to the separating means, means forming a slurry of separated ice crystals and solvent and delivering the slurry into the condenser for direct contact with the refrigerant vapor to condense the latter and melt the ice crystals, said liquid refrigerant and condensed solvent separating by gravity in the condenser, said line for delivering liquid refrigerant to the evaporator-freezer being connected to withdraw liquid refrigerant from the condenser, and said means forming a slurry of ice crystals and solvent comprising a conduit for delivering liquid solvent from the condenser.

2. An apparatus in accordance with claim 1 in which the evaporator-freezer has means to divide it into an agitated zone and a calming zone, said agitator being located in said one zone for agitating the refrigerant, and said conduit means for withdrawing a slurry of ice crystals and solution being connected to the evaporator-freezer in the calming zone below the liquid level therein.

3. An apparatus in accordance with claim 1 in which the agitator has blades immersed in the solution so as to contact the liquid refrigerant tending to accumulate at the top thereof to divide it into drops and deliver the drops down into the solution.

4. An apparatus in accordance with claim 1 in which a plurality of evaporator-freezers are provided, a separate compressor for each evaporator-freezer and connected to deliver refrigerant vapor therefrom to the condenser, and conduits connected to deliver solution to the plurality of evaporator-freezers successively in one direction and deliver the crystals frozen in each evaporator-freezer to the other evaporator-freezers, successively, in the opposite direction and then to the condenser.

5. An apparatus in accordance with claim 1 in which a direct contact heat exchanger is provided which is connected between inlet and outlet lines to and from said system comprising a plurality of vessels containing an immiscible heat exchange fluid separate from the refrigerant and connected so that the heat exchange fluid flows from the top of each vessel to the bottom of another vessel, a line for delivering cold liquid to the top of one of the vessels for flow through the heat exchange liquid to exchange heat therewith, a line for delivering solution to the top of another vessel for flow through the heat exchange liquid therein to exchange heat therewith, and a separate line from the lower end of each of the vessels for delivering the separate liquids from the respective vessels.

6. An apparatus in accordance with claim 5 in which the line for delivering cold liquid connects the condenser to the top of one vessel of the liquid heat exchanger to deliver liquid solvent thereto.

7. A system in accordance with claim 6 in which said line for delivering cold liquid to one of the vessels of the heat exchanger is connected to the evaporator-freezer for delivering cold solution to the latter.

8. An apparatus for separating a solvent from a solution containing the solvent by direct contact with a volatile refrigerant immiscible with the solvent or solution comprising an evaporator-freezer, a line for delivering solution to the evaporator-freezer, a line for delivering a liquid refrigerant to the evaporator-freezer for direct contact with the solvent below the liquid level therein, means dividing said evaporator-freezer into an agitating zone and a calming zone, said apparatus containing sufficient refrigerant to produce a layer thereof in liquid phase in interface contact with the body of solution in the evaporator-freezer, an agitator which mixes the liquid refrigerant at the top of the body of solution as dispersed drops down into the solution, said agitator being located in said zone to be agitated, a condenser, means for delivering refrigerant vapor from the evaporator-freezer to the condenser whereby to evaporate the volatile refrigerant in the evaporator-freezer and produce a pressure and temperature therein to freeze solvent from solution, separating means for separating ice crystals from solution, conduit means for withdrawing a slurry of ice crystals and solution from the evaporator-freezer and delivering it to the separating means, said conduit means for withdrawing a slurry of ice crystals and solution being connected to the evaporator-freezer in the calming zone below the liquid level therein, means forming a slurry of separated ice crystals and solvent and delivering the slurry into the condenser for direct contact with the refrigerant vapor to condense the latter and melt the ice crystals, said liquid refrigerant and condensed solvent separating by gravity in the condenser, said line for delivering liquid refrigerant to the evaporator-freezer being connected to withdraw liquid refrigerant from the condenser, said means forming a slurry of ice crystals comprising a conduit for delivering liquid solvent from the condenser, and a direct contact heat exchanger connected between inlet and outlet lines to and from said system comprising a plurality of vessels containing an immiscible heat exchange fluid separate from the refrigerant and connected so that the heat exchange fluid flows from the top of each vessel to the bottom of another vessel, a line for delivering cool liquid to the top of one of the vessels for flow through the heat exchange liquid to exchange heat therewith, a line for delivering solution to the top of another vessel for flow through the heat exchange liquid therein to exchange heat therewith, and a separate line from the lower end of each of the vessels for delivering the separate liquid from the respective vessels.

9. An apparatus for separating a solvent from a solution containing the solvent by direct contact with a volatile refrigerant immiscible with the solvent or solution comprising a plurality of evaporator-freezers, conduit means connected to deliver solution to the plurality of evaporator-freezers, successively, in one direction and deliver crystals frozen in each evaporator-freezer to the other evaporator-freezers, successively, in the opposite direction, means to divide each evaporator-freezer into an agitated zone and a calming zone, said apparatus containing sufficient refrigerant to produce a layer thereof in liquid phase in interface contact with the body of solution in each of the evaporator-freezers, an agitator in each evaporator-freezer which mixes the liquid refrigerant at the top of the body of solution as dispersed drops down into the solution, said agitator being located in said agitated zone, a condenser, a compressor for each evaporator-freezer and connected to deliver refrigerant vapor therefrom to the condenser whereby to evaporate the volatile refrigerant to produce a temperature and pressure in each evaporator-freezer to freeze solvent from solution, separating means for separating ice crystals from solution, conduit means for withdrawing a slurry of ice crystals and solution from the last of the successive evaporator-freezers and deliver it to the separating means, said conduit means being connected to the evaporator-freezer in the calming zone below the liquid level therein, means forming a slurry of separated ice crystals and solvent and delivering the slurry into the condenser for direct contact with the refrigerant vapor to condense the latter and melt the ice crystals, said liquid refrigerant and condensed solvent separating by gravity in the condenser, said line for delivering liquid refrigerant to the evaporator-freezer being connected to withdraw liquid refrigerant from the condenser, said means forming a slurry of ice crystals and solvent comprising a conduit for delivering liquid solvent from the condenser, and a direct contact heat exchanger connected between inlet and outlet lines to and from said system comprising a plurality of vessels containing an immiscible heat exchange fluid separate from the refrigerant and connected so that the heat exchange fluid flows from the top of each vessel to the bottom of another vessel, a line for delivering cool liquid to the top of one of the vessels for flow through the heat exchange liquid to exchange heat therewith, a line for delivering solution to the top of another vessel for flow through the heat exchange liquid therein to exchange heat therewith, and a separate line from the lower end of each of the vessels for delivering the separate liquid from the respective vessels.

References Cited by the Examiner

UNITED STATES PATENTS

| | | | |
|---|---|---|---|
| 3,098,733 | 7/1963 | Rosenstein et al. | 62—58 |
| 3,137,554 | 6/1964 | Gilliland et al. | 62—123 X |
| 3,150,499 | 9/1964 | Margiloff | 62—123 |
| 3,167,401 | 1/1965 | Herman | 62—58 X |
| 3,177,673 | 3/1965 | Svanoe | 62—123 X |

FOREIGN PATENTS 70,507   6/1946   Norway.

ROBERT A. O'LEARY, *Primary Examiner.*

MEYER PERLIN, *Examiner.*

W. E. WAYNER, *Assistant Examiner.*